United States Patent
Ito et al.

(10) Patent No.: US 6,239,828 B1
(45) Date of Patent: *May 29, 2001

(54) IMAGE FORMATION DEVICE FOR FORMING A COLOR IMAGE COMPOSED OF PLURAL COLORS

(75) Inventors: Masao Ito, Ebina; Shoji Yamaguchi, Nakai-machi, both of (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,472

(22) Filed: Sep. 3, 1999

(30) Foreign Application Priority Data

Sep. 10, 1998 (JP) .................................................. 10-256992
Sep. 10, 1998 (JP) .................................................. 10-256993
Nov. 6, 1998 (JP) .................................................. 10-316138

(51) Int. Cl.[7] .................................................. B41J 15/14
(52) U.S. Cl. .................................................. 347/241; 347/256
(58) Field of Search .................................................. 347/135, 233, 347/236, 237, 238, 246, 247, 241, 255, 256, 244, 258; 250/201.2, 559.06, 578.1; 359/495, 629, 633, 668, 679, 711

(56) References Cited

U.S. PATENT DOCUMENTS 5,432,537 * 7/1995 Imakawa et al. .................... 347/135
5,956,070 * 9/1999 Paoli et al. .......................... 347/241
5,963,242 * 10/1999 Nakayama et al. ................. 347/238

FOREIGN PATENT DOCUMENTS 8-181871   7/1996   (JP) .
9-193450   7/1997   (JP) .

* cited by examiner

Primary Examiner—N. Le
Assistant Examiner—Hai C. Pham
(74) Attorney, Agent, or Firm—Oliff & Berridge, PLC

(57) ABSTRACT

This invention provides an image formation device at low cost, which can be miniaturized, of which the quality of an image is uniform, which can form a high resolution of color image at high speed wherein even if the relative mounting position of a light source and an optical element is dislocated, the deterioration of color registration can be reduced. Laser beams for each color sequentially emitted from each laser element of a laser array pass an imaging optical system and are split into the side of photoconductor drums and into the side of a deflecting optical system by a splitting optical system. Laser beams incident on the deflecting optical system are reflected by optical mirrors so that principal rays of the laser beams respectively converge on photodetectors and are incident on approximately the same position of each photodetector. The photodetectors individually detect the luminous energy of laser beams from each laser element.

16 Claims, 19 Drawing Sheets

IMAGE FORMATION DEVICE FOR FORMING A COLOR IMAGE COMPOSED OF PLURAL COLORS

BACKGROUND OF THE INVENTION

1. Field of the Invention

The present invention relates to an image formation device such as a laser beam printer, an LED array printer and a digital copying machine for forming a multicolor image using arrayed light sources, particularly relates to an image formation device which can be miniaturized, of which the quality of an image is uniform, which can form a high resolution of color image at high speed and in which the deterioration of color registration can be reduced even if the relative position of a light source and an optical element is dislocated.

2. Description of the Related Art

A conventional type image formation device emits a laser beam modulated according to a picture signal from a laser beam source for example, scans the laser beam in a horizontal scanning direction using a polygon mirror, exposes a photoconductor drum rotated in a vertical scanning direction by the laser beam scanned using the polygon mirror, forms an electrostatic latent image on the photoconductor drum by the above exposure scanning and implements the recording of an image based upon the electrostatic latent image.

However, according to the light deflection type image formation device using a polygon mirror, as the speedup of the rotational speed of the polygon mirror is limited, the speedup of recording rate is limited.

To speed up the recording rate of an image formation device, an image formation device using arrayed light sources for emitting plural light beams by driving according to the pattern of a recorded image without a polygon mirror is being studied.

A conventional type image formation device not using a polygon mirror is disclosed in Japanese Published Unexamined Patent Application No. Hei 9-193450 for example.

FIG. 21 shows the image formation device. The image formation device is provided with a laser array 100 having plural laser beam emitting elements 100*a* arrayed in a horizontal scanning direction, a photoconductor drum 105 exposed by plural laser beams 101 emitted from each laser beam emitting element 100*a* on which an electrostatic latent image according to a picture signal is formed by moving the photoconductor drum in a vertical scanning direction differently from the laser array 100, a field lens 102 as a projection optical system for focusing plural laser beams 101 emitted from plural laser beam emitting elements 100*a* on a common focus 106, an imaging lens system 107 arranged on the focus 106 as a projection optical system for imaging the plural laser beams 101 on the photoconductor drum 105 and forming plural beam spots on the photoconductor drum 105, a half mirror 103 arranged between the field lens 102 and the imaging lens system 107, a photo detecting element 104 for detecting the luminous energy of a laser beam reflected by the half mirror 103 and a control part for controlling the driving condition of each laser beam emitting element 100*a* based upon a signal detected by the photo detecting element 104.

Hereby, as plural laser beam emitting elements 100*a* can be simultaneously driven according to the pattern of a recorded image, a recording rate can be sped up. As the laser beam emitting elements 100*a* can be arranged in high density, a high resolution of image can be acquired. Also, as each laser beam emitting element 100*a* can correct luminous energy, luminous energy can be kept uniform and a uniform image can be acquired.

There is known a multicolor image formation device using a light emitting element array in which multiple light emitting elements are arranged corresponding to the scanning width of an output image as a light source for projecting by an optical system and forming an image on a photoconductor as disclosed in Japanese Published Unexamined Patent Application No. Hei 8-181871 for example.

FIGS. 22A and 22B show the conventional type multicolor image formation device. The multicolor image formation device is provided with plural light emitting diode (LED) arrays 101Y, 101M, 101C and 101K respectively provided corresponding to yellow (Y), magenta (M), cyan (C) and black (K) in which each LED is arranged in the direction of the width of an image (a horizontal scanning direction), driving circuits 10Y, 100M, 100C and 100K for driving each LED array 110Y, 10M, 101C and 101K based upon Y image data, M image data, C image data and K image data respectively corresponding to Y, M, C and K and emitting plural light beams 102*y*, 102*m*, 102*c* and 102*k*, photoconductor drums 104Y, 104M, 104C and 104K arranged along a traveling route 105 of paper P corresponding to each color and rotated in a direction shown by an arrow (in a vertical scanning direction) and projection optical systems 103Y, 103M, 103C and 103K for respectively projecting and imaging plural light beams 102*y*, 102*m*, 102*c* and 102k respectively from the LED arrays 101Y, 101M, 101C and 101K on the photoconductor drums 104Y, 104M, 104C and 104K as shown in FIG. 22A.

The LED array 101 is attached to a case 106 via a mounting plate 107 as shown in FIG. 22B and the projection optical system 103 is attached to the case 106 via a mounting member 108 so that it is located immediately under the LED array 101. Hereby, as plural LEDs can be simultaneously driven according to the pattern of a recorded image, a color image can be recorded at high speed.

However, according to the conventional type image formation device, if the laser array, the LED array, the projection optical system and a luminous energy detecting system are provided for every color to form a color image, there is a problem that the device is large-sized.

According to the conventional type multicolor image formation device, as the projection optical system is independent for every color, the exposed position of each color is dislocated when the position of the LED array and an optical element changes because of the change of temperature, vibration and the like and so-called color registration is deteriorated. As a result, a problem arises that the quality of an output image is deteriorated.

SUMMARY OF THE INVENTION

Therefore, an object of the present invention is to provide an image formation device which is low-priced, can be miniaturized and can form a high resolution of color image at high speed.

Also, another object of the present invention is to provide an image formation device which can be miniaturized and can form a high resolution of color image of which the quality is uniform at high speed.

Also, the other object of the present invention is to provide an image formation device wherein the deterioration of color registration can be reduced even if the relative mounted position of a light source and an optical element is dislocated.

To realize the above object, the present invention provides an image formation device based upon an image formation device for forming a color image composed of plural colors and characterized by being provided with plural light source arrays provided corresponding to plural colors and having plural light emitting elements arrayed at least in a horizontal scanning direction for emitting plural light beams modulated based upon a picture signal corresponding to the plural colors from the plural light emitting elements, plural image carriers provided corresponding to the plural colors and exposed by the plural light beams from the plural light source arrays on which a latent image is formed by moving the image carrier in a vertical scanning direction, a projection optical system for imaging the plural light beams from the plural light source arrays focused on a common focus on the plural image carriers and forming the above latent image.

According to the above configuration, the optical system is miniaturized by imaging plural light beams emitted from plural light emitting elements corresponding to each color on the plural image carriers by a common projection optical system and even if the relative mounted position of the light source and the optical element is dislocated, the deterioration of color registration can be reduced. The density of a beam spot formed on the image carrier is enhanced by arraying plural light emitting elements in high density. Speedup is achieved by simultaneously driving plural light emitting elements.

To implement the above object, the present invention provides an image formation device based upon an image formation device for forming a color image composed of plural colors and characterized by being provided with plural light source arrays provided corresponding to plural colors and having plural light emitting elements arrayed at least in a horizontal scanning direction for emitting plural light beams modulated based upon a picture signal corresponding to the plural colors from the plural light emitting elements, plural image carriers provided corresponding to the plural colors, exposed by the plural light beams from the plural light source arrays for forming a latent image by moving in a vertical scanning direction, a projection optical system for imaging the plural light beams from the plural light source arrays focused on a common focus on the plural image carriers and forming the above latent image, a detecting part for detecting the luminous energy of the plural light beams from the plural light source arrays and a control part for controlling the driving condition of the plural light emitting elements based upon the luminous energy of the plural light beams detected by the above detecting part.

According to the above configuration, a uniform quality of image is acquired by controlling the driving condition of plural semiconductor laser elements based upon the luminous energy of plural laser beams detected by the detecting part.

To realize the above object, the present invention provides an image formation device based upon an image formation device for forming a color image composed of plural colors and characterized by being provided with plural light source arrays in which plural light emitting element groups composed of plural light emitting elements arrayed at least in a horizontal scanning direction are arrayed in a vertical scanning direction corresponding to plural colors for emitting plural light beams modulated based upon a picture signal corresponding to the plural colors from the plural light emitting elements in the corresponding light emitting element group, plural image carriers provided corresponding to the plural colors, exposed by the plural light beams from the plural light emitting element groups for forming a latent image by moving the carriers in the vertical scanning direction, an imaging optical system for forming the above latent image by imaging the plural light beams from the plural light emitting element groups on the plural image carriers, a splitting/deflecting optical system arranged on the optical paths of the plural light beams from the plural light emitting element groups for splitting the plural light beams from the plural light emitting element groups into directions of the plural image carriers and predetermined directions different from the directions of the plural image carriers and deflecting the plural light beams split into the above predetermined directions so that principal rays of the light beams converge, a detecting part arranged at a point at which the above principal rays generated by the above splitting/deflecting optical system converge or in the vicinity thereof for detecting the luminous energy of the plural light beams and a control part for controlling the driving condition of the plural light emitting elements based upon the luminous energy of the plural light beams detected by the above detecting part.

According to the above configuration, the optical system is miniaturized by imaging plural light beams emitted from plural light emitting element groups corresponding to each color on plural image carriers by a common imaging optical system. As only one imaging optical system is required, the cost is reduced. The density of beam spots formed on the image carrier is enhanced by arraying plural light emitting elements in high density. Further, speedup is achieved by simultaneously driving plural light emitting elements. A uniform quality of image is acquired by controlling the driving condition of plural light emitting elements based upon the luminous energy of plural light beams detected by the detecting part.

DESCRIPTION OF THE PREFERRED EMBODIMENTS

Figure 1:
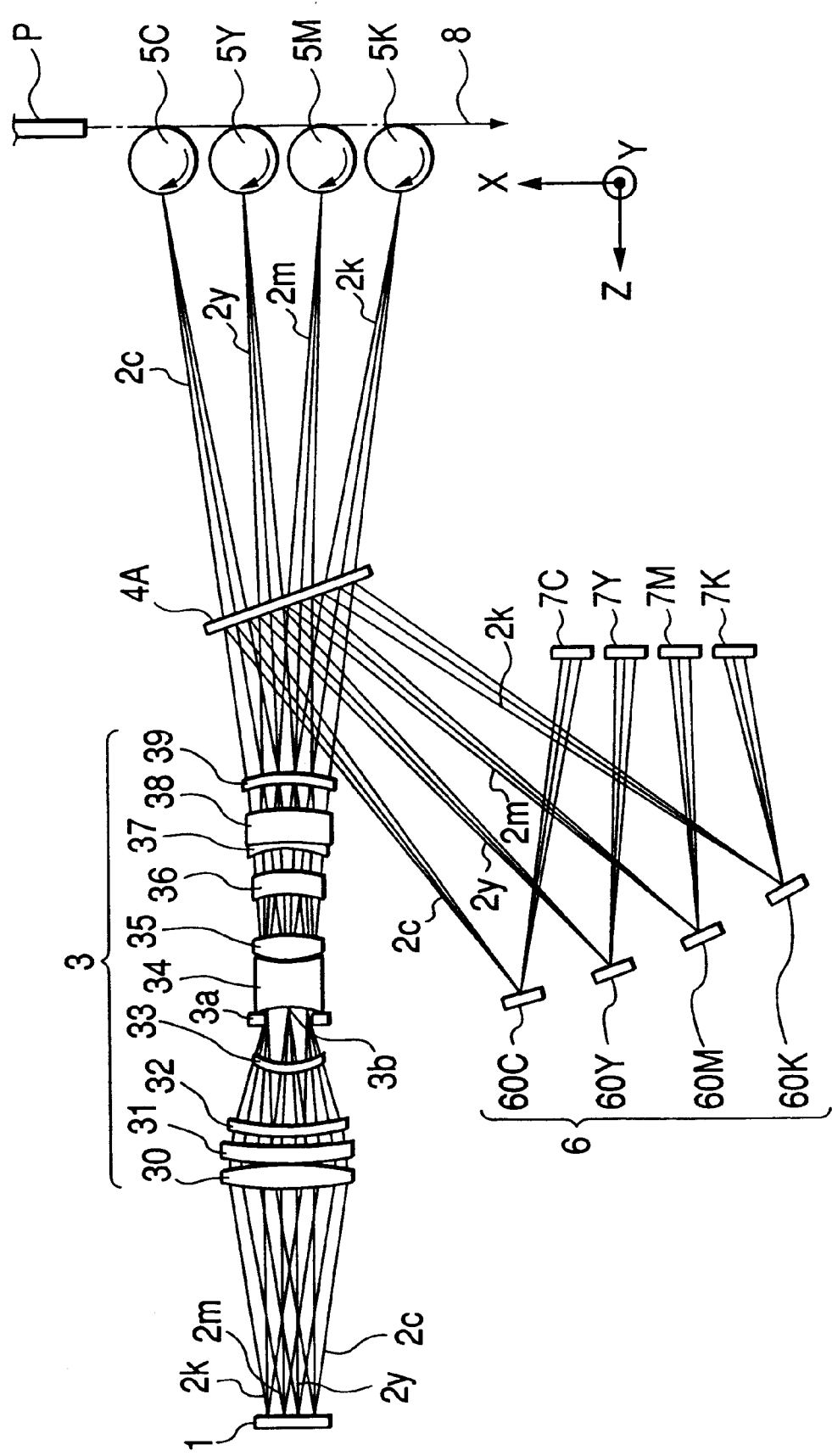
FIG. 1 shows the XZ coordinate plane of an image formation device equivalent to a first embodiment of the present invention.
Figure 2:
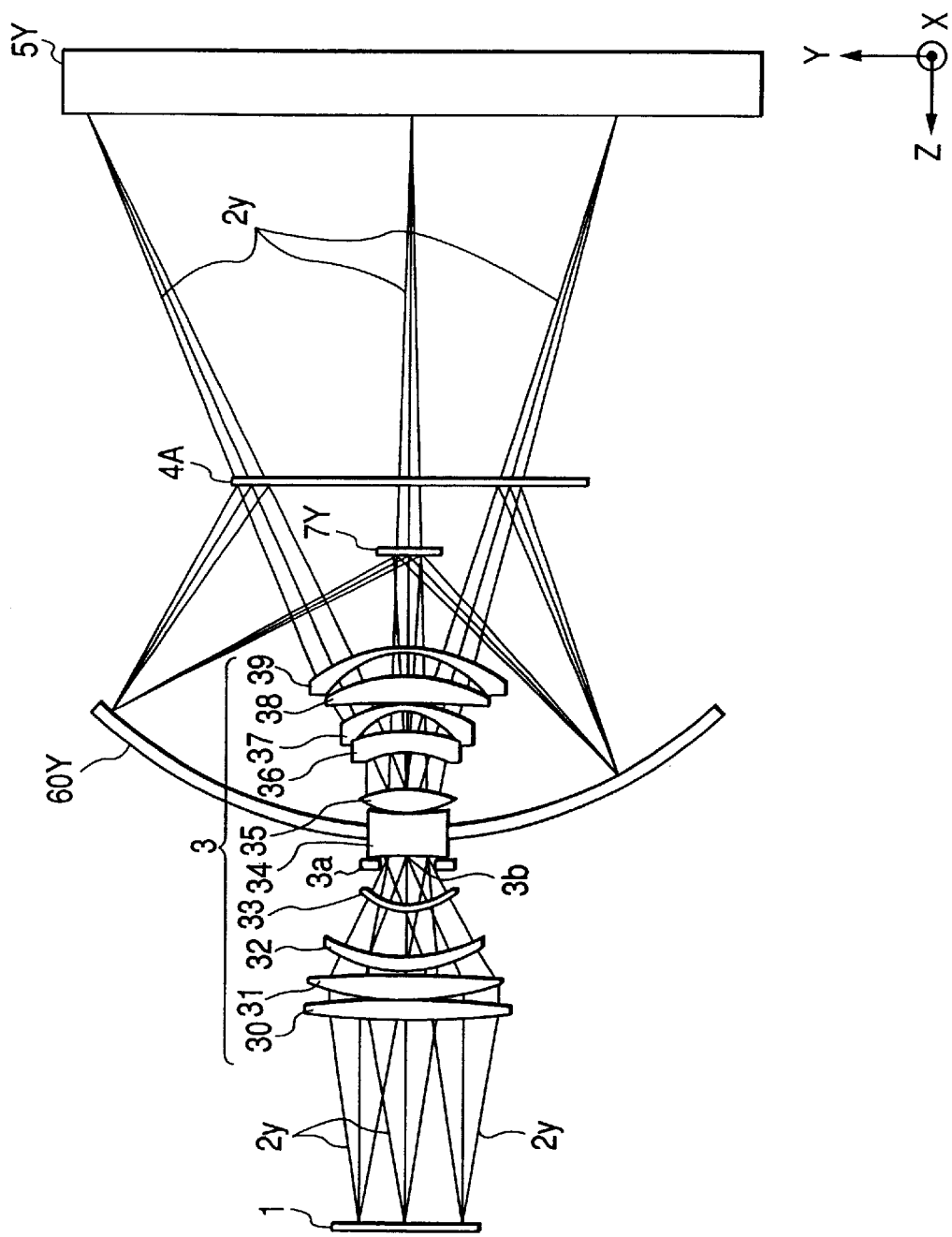
FIG. 2 shows the YZ coordinate plane of the image formation device equivalent to the first embodiment of the present invention.

FIGS. 1 and 2 show an image formation device equivalent to a first embodiment of the present invention. In FIGS. 1 and 2, "x" denotes a vertical scanning direction (a direction in which a photoconductor drum is moved), "Y" denotes a horizontal scanning direction (a direction perpendicular to the vertical scanning direction) and "Z" denotes the direction of an optical axis. FIG. 1 shows an XZ coordinate plane and FIG. 2 shows a YZ coordinate plane of a part corresponding to a laser beam for yellow (Y). The above image formation device is provided with a semiconductor laser array 1 (hereinafter called a laser array) for emitting plural laser beams 2 (2c, 2y, 2m, 2k) modulated based upon a picture signal of each color of cyan (C), yellow (Y), magenta (M) and black (K), plural photoconductor drums 5C, 5Y, 5M, 5K provided corresponding to each color of C, Y, M, K and rotated in a direction shown by each arrow, an imaging optical system 3 which is a magnifying optical system for forming an electrostatic latent image on each surface of the photoconductor drums 5C, 5Y, 5M, 5K by imaging plural laser beams 2c, 2y, 2m, 2k of each color emitted from the laser array 1 on each surface of the corresponding photoconductor drums 5C, 5Y, 5M, 5K after the above laser beams are focused on a common focus 3b, a splitting optical system 4A arranged between the imaging optical system 3 and the photoconductor drums 5C, 5Y, 5M, 5K such as a beam splitter for splitting plural laser beams 2c, 2y, 2m, 2k of each color from the laser array 1 into the direction of an optical axis Z and a predetermined direction different from the direction of the optical axis Z, a deflecting optical system 6 for deflecting plural laser beams 2c, 2y, 2m, 2k of each color split into the predetermined direction by the splitting optical system 4A so that principal rays of the laser beams 2 respectively converge and photodetectors 7C, 7Y, 7M, 7K arranged at a point at which the principal rays deflected by the deflecting optical system 6 respectively converge or in the vicinity for detecting each luminous energy of laser beams 2c, 2y, 2m, 2k of each color from the laser array 1.

Also, the above image formation device is provided with an electrifier, a developing device, a transfer device and the like around each photoconductor drum 5C, 5Y, 5M, 5K, the traveling route 8 of paper P as a transfer medium is formed along each photoconductor drum 5C, 5Y, 5M, 5K, a paper feeding unit is provided prior to the traveling route 8, a fixing device, a paper ejecting unit and the like are provided next to the traveling route 8. These units are not shown in the drawings. A color image is formed on the paper P by transferring a toner image respectively formed on the photoconductor drums 5C, 5Y, 5M, 5K by the developing machines on the paper P carried along the traveling route 8 and fixing it by the fixing device. For a transfer medium, an intermediate transfer belt is used and after a toner image of each color is once transferred on the intermediate transfer belt, the toner image of each color may also be collectively transferred and fixed on the paper.

The imaging optical system 3 is provided with a first lens 30 having positive power of which the convex surface is directed on the side of the laser array 1, a second lens 31 having positive power of which the convex surface is directed on the side of the laser array 1, a third lens 32 having positive power of which the convex surface is directed on the side of the laser array 1, a fourth lens 33 having negative power of which the convex surface is directed on the side of the laser array 1, a fifth lens 34 having negative power of which the concave surface is directed on the side of the laser array 1, a sixth lens 35 having positive power of which the convex surface is directed on the side of the laser array 1, a seventh lens 36 having negative power of which the concave surface is directed on the side of the laser array 1, an eighth lens 37 having negative power of which the concave surface is directed on the side of the laser array 1. a ninth lens 38 having positive power of which the concave surface is directed on the side of the laser array 1, a tenth lens 39 having negative power of which the concave surface is directed on the side of the laser array 1 and a diaphragm 3a arranged in a synthetic focal position (a common focus) 3b made by the first to fourth lenses 30 to 33, and the side of the laser array 1 composes a telecentric system.

The splitting optical system 4A is composed of optical glass such as borosilicate crown glass No. 7 (BK7), splits each laser beam 2c, 2y, 2m, 2k from the laser array 1 into transmitted light and reflected light and the ratio is determined depending upon the sensitivity of the photodetectors 7C, 7Y, 7M, 7K and the sensitivity of the surface of the photoconductor drums 5C, 5Y, 5M, 5K. In this embodiment, the ratio of transmitted light to reflected light is 1 to 4. Considering a case that the polarization angle of each laser beam 2c, 2y, 2m, 2k varies widely, a special coat, for example a dielectric multilayer film, is applied to the surface of the splitting optical system 4A. Even if dispersion between the respective polarization angles of S polarized light and P polarized light of laser beams 2c, 2y, 2m, 2k from the laser array 1 is any of 0 to 90°, dispersion among total luminous energy incident on the photodetectors 7C, 7Y, 7M, 7K can be reduced up to 1% or less owing to the coat.

For the deflecting optical system 6, optical mirrors 60C, 60Y, 60M, 60K provided corresponding to each color, having a toroidal surface (approximately an ellipsoid) in a horizontal scanning direction Y and having a cylindrical surface (a circular surface) in a vertical scanning direction X are used. FIG. 2 shows the optical mirror 60Y and the photodetector 7Y respectively corresponding to a laser beam 2y for yellow. The optical mirror 60C for C deflects plural laser beams 2c from the splitting optical system 4A so that principal rays of the beams 2c converge on the photodetector 7C, the optical mirror 60Y for Y deflects plural laser beams 2y from the splitting optical system 4A so that principal rays of the beams 2y converge on the photodetector 7Y, the optical mirror 60M for M deflects plural laser beams 2m from the splitting optical system 4A so that principal rays of the beams 2m converge on the photodetector 7M and the optical mirror 60 K for K deflects plural laser beams 2k from the splitting optical system 4A so that principal rays of the beams 2k converge on the photodetector 7K.

For the photodetectors 7C, 7Y, 7M, 7K, a photodiode is used for example and its effective diameter is set so that it is the double or more of a beam diameter in $1/e^2$ of the luminous intensity of laser beams 2c, 2y, 2m, 2k incident on each detection surface of the photodetectors 7C, 7Y, 7M, 7K to enhance reliability in detecting luminous energy.

Figure 3:
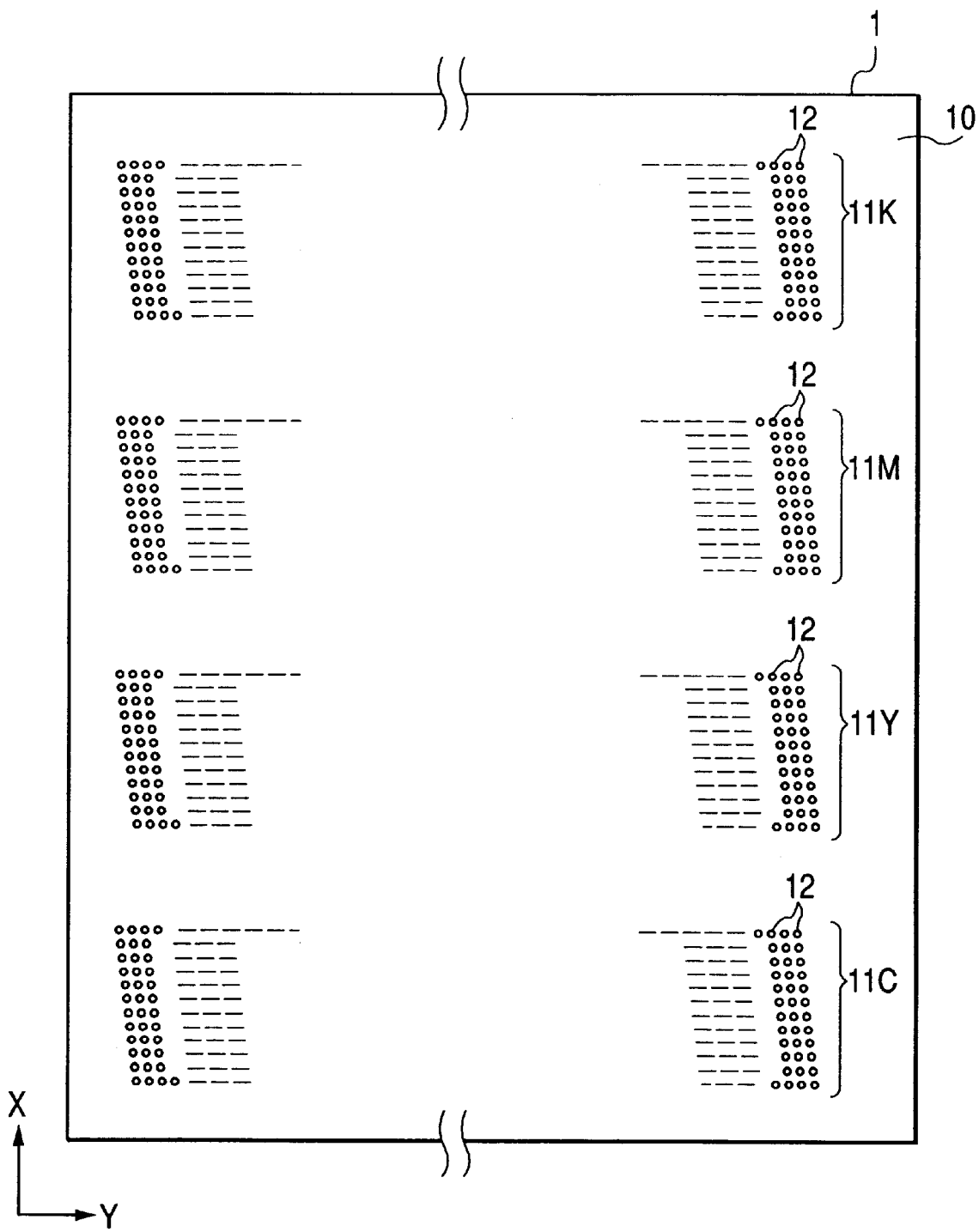
FIG. 3 is a front view showing laser arrays in the first embodiment of the present invention.

FIG. 3 shows the laser array 1. The length in the horizontal scanning direction Y of the laser array 1 is approximately 50 mm for example, four laser element groups 11C, 11Y, 11M, 11K are arranged in the vertical scanning direction X corresponding to each color of C, Y, M, K on a substrate 10 and in each laser element group 11C, 11Y, 11M, 11K, total 14,400 pieces composed of 12 pieces in the vertical scanning direction X and 1,200 pieces in the horizontal scanning direction Y of semiconductor laser elements 12 (hereinafter called laser elements) such as planar light emitting laser elements are arrayed.

Figure 4:
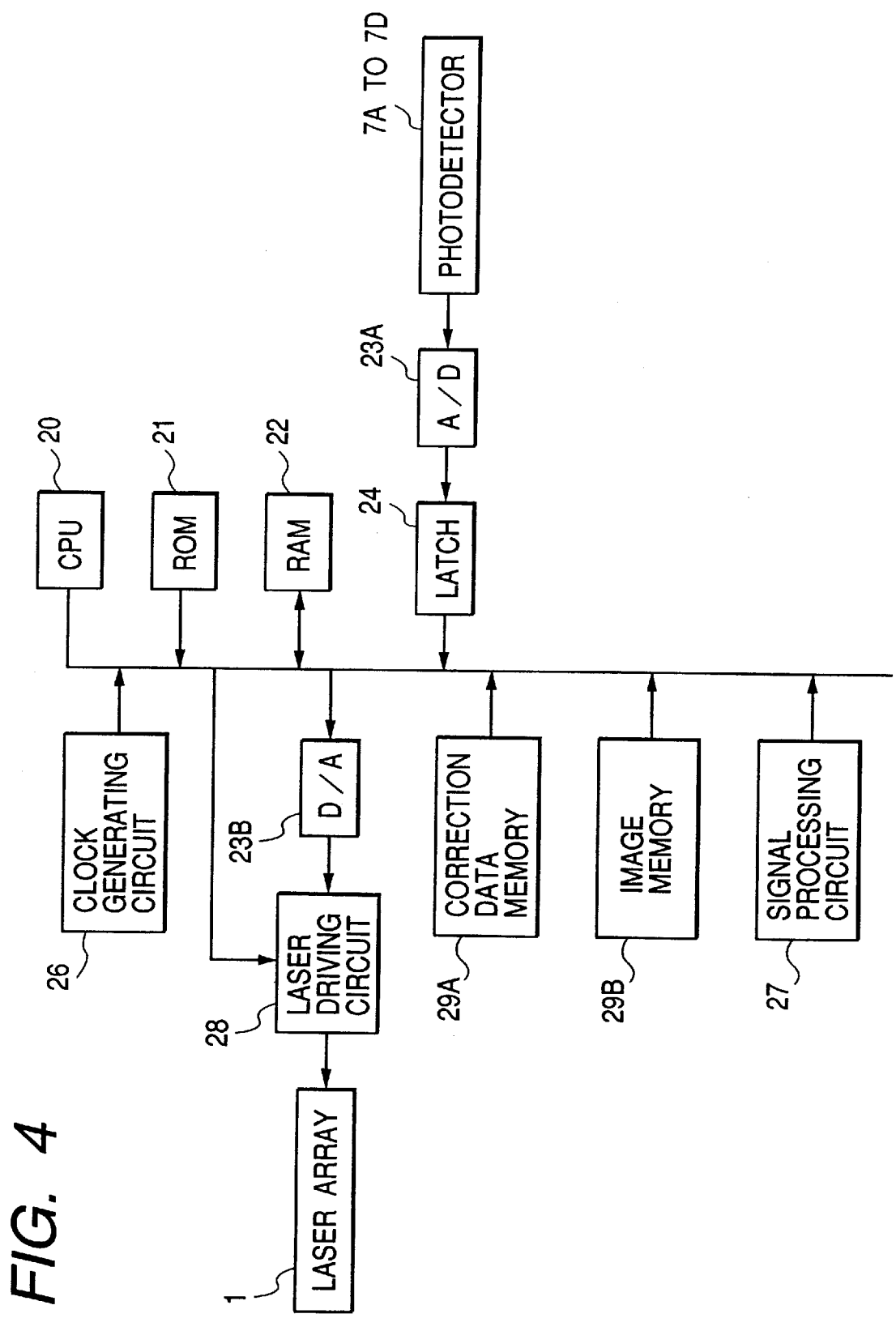
FIG. 4 is a block diagram showing the main part of a control system in the image formation device equivalent to the first embodiment of the present invention.

FIG. 4 shows the main part of a control system of the image formation device. The image formation device is provided with CPU 20 for controlling the whole device, and ROM 21 for storing programs for CPU 20 such as a program for a test mode and a program for an image recording mode, RAM 22 for storing various information, a latch 24 for latching a detected value output from the photodetectors 7C, 7Y, 7M, 7K via an A/D converter 23A, a clock generating circuit 26 for outputting a basic clock, a laser driving circuit 28 connected via a D/A converter 23B for outputting a driving signal for driving each laser element 12 in the laser array 1, a correction data memory 29A in which the information of a current value for driving each laser element 12 is stored beforehand as correction data, an image memory 29B for storing a picture signal corresponding to each color of C, Y, M, K and a signal processing circuit 27 for reading a picture signal from the image memory 29B, processing the picture signal and outputting a recording signal according to a record pattern are connected to a bus to which CPU 20 is connected.

In RAM 22, a reference value of predetermined luminous energy is stored beforehand every laser element 12. The reference value of each laser element 12 may also be the same and may also be different according to the characteristics and the like of each unit in the laser array 1.

At predetermined timing, for example, when the device is powered on by an operator, CPU 20 executes a test mode and executes an image recording mode when the operator operates.

Next, the operation of the first embodiment will be described.

(1) Test Mode

When an operator powers on the device, a device seizing signal is input to CPU 20. CPU 20 executes the following test mode according to a program for a test mode stored in ROM 21 according to the device seizing signal.

CPU 20 outputs correction data stored in the correction data memory 29A beforehand to the D/A converter 23B. The D/A converter 23B converts the correction data from the correction data memory 29A from digital to analog and outputs it to the laser driving circuit 28. The laser driving circuit 28 sequentially drives each laser element 12 of the laser array 1 based upon the output from the D/A converter 23B in synchronization with a basic clock output from the clock generating circuit 26. Each laser element 12 sequentially emits laser beams 2c, 2y, 2m, 2k. Laser beams 2c, 2y, 2m, 2k sequentially emitted from each laser element 12 pass the imaging optical system 3 and are split into the side of the photoconductor drums 5C, 5Y, 5M, 5K and the side of the deflecting optical system 6 by the splitting optical system 4A. Laser beams 2c, 2y, 2m, 2k which pass the splitting optical system 4A are imaged on the surface of the corresponding photoconductor drums 5c, 5Y, 5M, 5K. In the meantime, laser beams 2c, 2y, 2m, 2k incident on the deflecting optical system 6 are reflected by the optical mirrors 60C, 60Y, 60M, 60K so that principal rays of the laser beams 2 respectively converge on photodetectors 7A, 7B, 7C, 7A and are incident on approximately the same position of each photodetector 7A to 7D.

The photodetector 7A to 7D individually detect the luminous energy of laser beams 2c, 2y, 2m, 2k from each laser element 12. The A/D converter 23A converts each value of the detected luminous energy from the photodetector 7C, 7Y, 7M, 7K from analog to digital and outputs it to the latch 24. The latch 24 sequentially latches each detected value from the photodetectors 7C, 7Y, 7M, 7K in synchronization with a basic clock output from the clock generating circuit 26 and outputs it to CPU 20. CPU 20 stores an output value from the latch 24 in RAM 22.

CPU 20 compares a value of detected luminous energy stored in RAM 22 for every laser element 12 and a reference value, operates and acquires a driving current value in which a detected value is equal to a reference value and stores the value as correction data in the correction data memory 29A. As described above, a test mode is finished.

(2) Image Recording Mode

When the above test mode is finished and an operator performs operation for recording, CPU 20 executes the following image recording mode according to a program for an image recording mode stored in ROM 21. The signal processing circuit 27 reads picture signals every color from the image memory 29B, processes them and outputs recording signals according to a record pattern to the A/D converter 23B. Simultaneously, CPU 20 outputs correction data after the test mode stored in the correction data memory 29A to the A/D converter 23B. The A/D converter 23B converts the recording signals from the signal processing circuit 27 and the correction data from the correction data memory 29A from digital to analog and outputs them to the laser driving circuit 28. The laser driving circuit 28 simultaneously drives each laser element 12 of the laser array 1 in units of one line in the horizontal scanning direction X for example based upon the recording signals and the correction data respectively input via the A/D converter 23B under control by CPU 20. Each laser element 12 sequentially emits laser beams 2c, 2y, 2m, 2k in units of one line. Laser beams 2c, 2y, 2m, 2k sequentially emitted from each laser element 12 are imaged at the luminous energy of a reference value set in the above test mode on the surface of the photoconductor drums 5C, 5Y, 5M, 5K via the splitting optical system 4A by the imaging optical system 3. Each surface of the photoconductor drums 5C, 5Y, 5M, 5K is exposed by laser beams 2c, 2y, 2m, 2k and an electrostatic latent image is formed on each surface of the photoconductor drums. Afterward, the electrostatic latent image is developed with toner by the developing device, the toner image is transferred on paper P fed along the traveling route 8 from the paper feeding unit by the transfer device and after the toner image is further fixed by the fixing device, the paper P is fed to the paper ejecting unit.

Next, the effect of the first embodiment will be described.

(a) As plural laser beams 2c, 2y, 2m, 2k respectively emitted from each laser element group 11C, 11Y, 11M, 11K are imaged on each photoconductor drum 5C, 5Y, 5M, 5K by a common imaging optical system 3, the optical system is miniaturized and the device can also be miniaturized. As plural laser elements 12 are arranged in high density, the density of beam spots formed on the photoconductor drums 5C, 5Y, 5M, 5K is enhanced and high resolution is acquired. As 1,200 pieces of laser elements 12 on one line in the horizontal scanning direction X are simultaneously driven, the recording of images is sped up.

(b) As the photodetectors 7C, 7Y, 7M, 7K are arranged at a point at which principal rays of plural laser beams 2c, 2y, 2m, 2k respectively deflected by the optical mirrors 60C, 60Y, 60M, 60K respectively converge or in the vicinity, plural laser beams 2c, 2y, 2m, 2k can be made incident on approximately the same position of each detection surface of the photodetectors 7C, 7Y, 7M, 7K, detection errors caused by dispersion among the sensitivity of the photodetectors 7C, 7Y, 7M, 7K are reduced and as a result, the luminous energy can be precisely detected.

(c) As each detection area of the photodetectors 7C, 7Y, 7M, 7K may be small, small-sized photodetectors 7C, 7Y, 7M, 7K can be used and as a mechanism for moving the photodetectors 7C, 7Y, 7M, 7K is not required, the device can be miniaturized.

(d) As the deflecting optical system 6 is composed of plural optical mirrors 60C, 60Y, 60M, 60K, the working of each optical mirror is facilitated compared with a case that the deflecting optical system is composed of one optical mirror, and the level of the luminous energy of each color can be independently and easily set.

(e) As the arrangement of the splitting optical system 4A, the optical mirrors 60C, 60Y, 60M, 60K and photodetectors 7C, 7Y, 7M, 7K can be easily changed in accordance with the composition of the optical systems, the photodetectors 7C, 7Y, 7M, 7K can respectively acquire a desired beam diameter and required photodetectors 7C, 7Y, 7M, 7K can be easily acquired.

(f) As the luminous energy of each laser beam 2c, 2y, 2m, 2k which passes the imaging optical system 3 is measured, dispersion in luminous energy approximately equivalent to dispersion in luminous energy among laser beams 2c, 2y, 2m, 2k on the photoconductor drums 5C, 5Y, 5M, 5K can be precisely detected.

Figure 5:
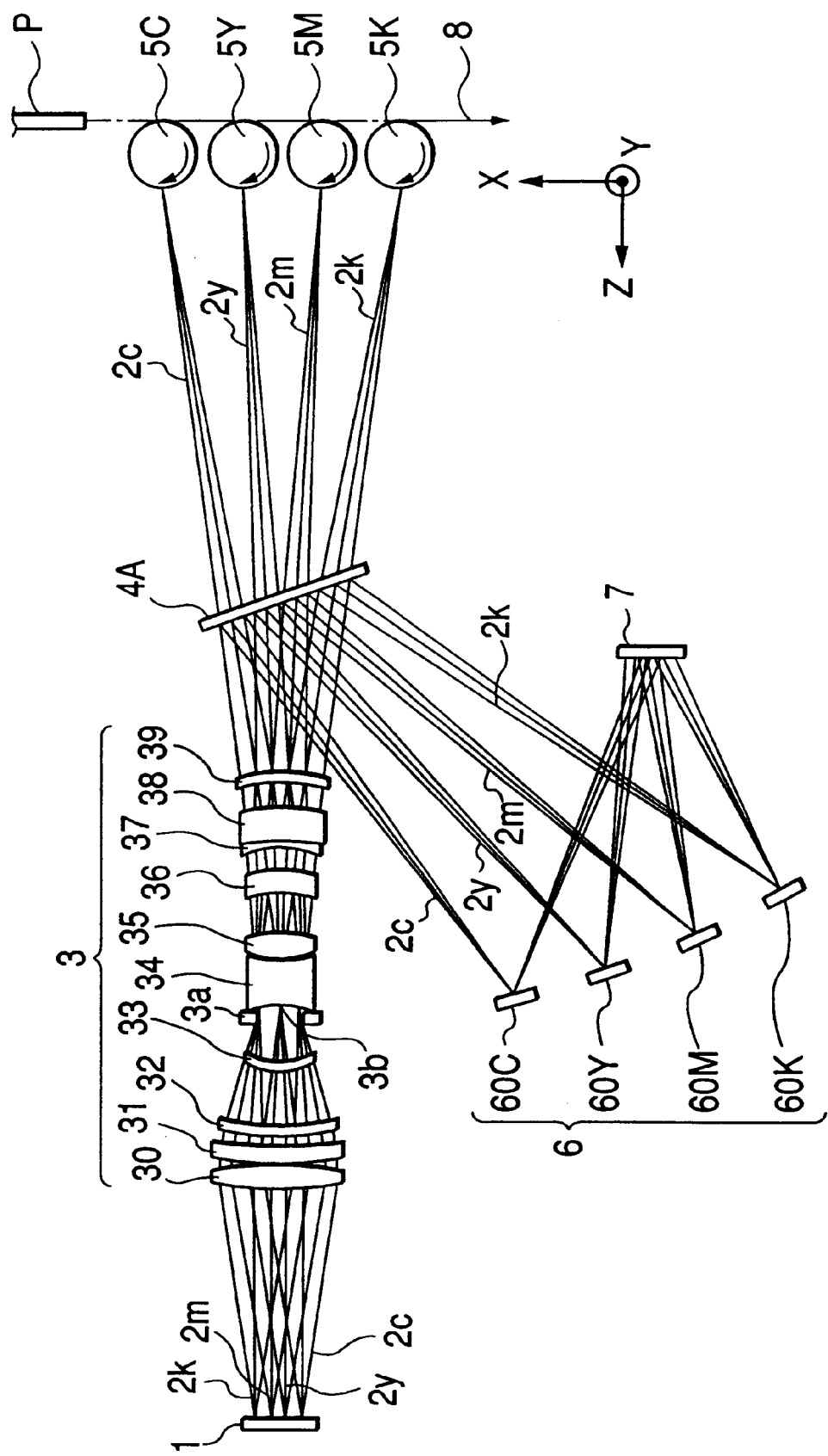
FIG. 5 shows the schematic configuration of an image formation device equivalent to a third embodiment of the present invention.

FIG. 5 shows an image formation device equivalent to a third embodiment of the present invention. In the third embodiment, for a luminous energy detecting system, a splitting optical system 4A, optical mirrors 60C, 60Y, 60M, 60K and one photodetector 7 are used, the optical mirrors 60C, 60Y, 60M, 60K of each color are arranged so that principal rays of four colors of laser beams 2c, 2y, 2m, 2k from the splitting optical system 4A converge on the photodetector 7, and the other part is composed as in the first embodiment. According to the third embodiment, the luminous energy of all laser elements 12 can be precisely controlled by regulating the driving current of each laser element 12 based upon the luminous energy of each laser beam 2c, 2y, 2m, 2k detected by the photodetector 7. As the luminous energy detecting system is composed of one splitting optical system 4A, the optical mirrors 60C, 60Y, 60M, 60K and one photodetector 7, the assembly and regulation are easier than those in the first and second embodiments. As only one photodetector 7 is required, the cost is further reduced and dispersion in sensitivity among photodetectors can be removed.

Figure 6:
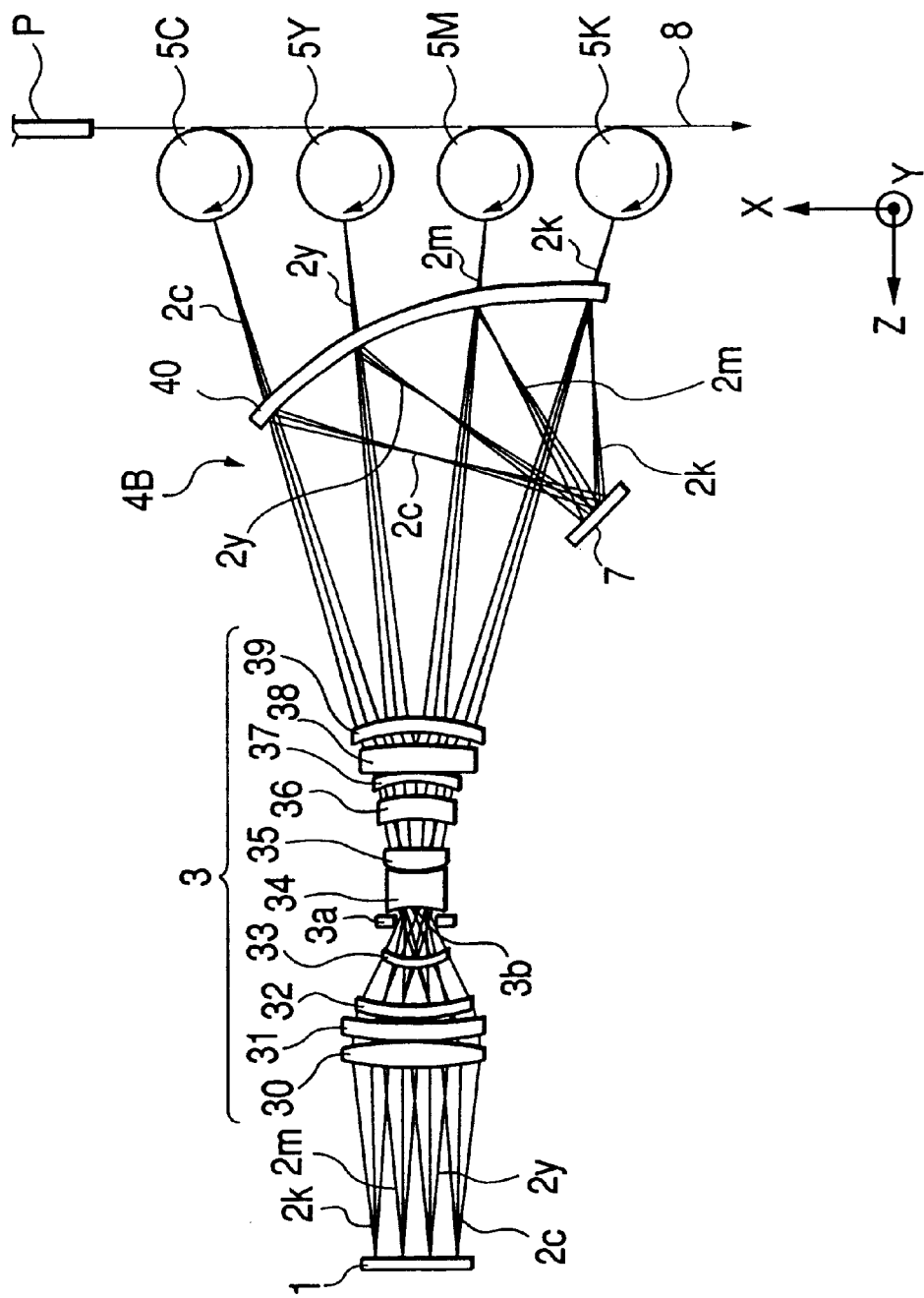
FIG. 6 shows the XZ coordinate plane of an image formation device equivalent to a fifth embodiment of the present invention.
Figure 7:
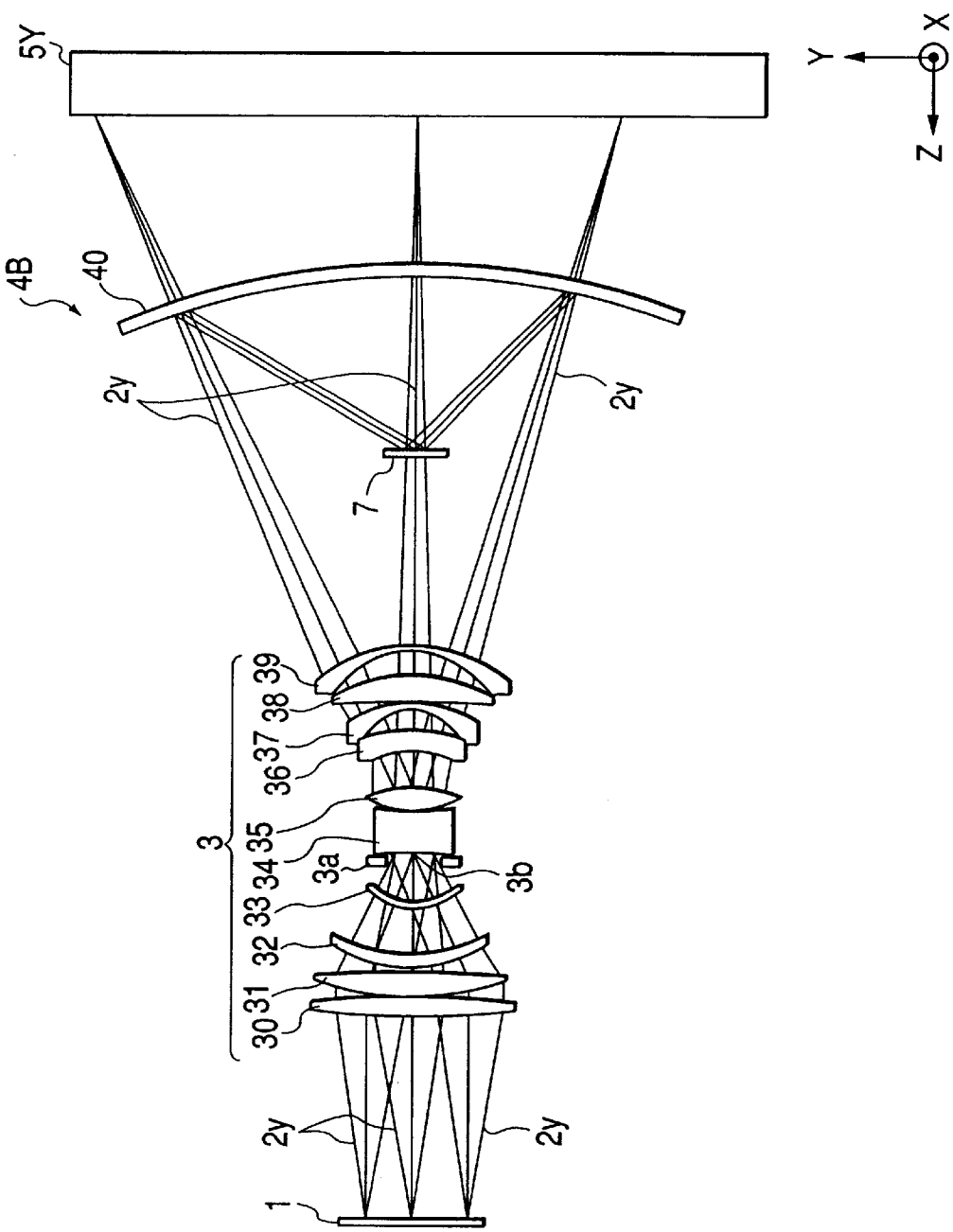
FIG. 7 shows the YZ coordinate plane of the image formation device equivalent to the fifth embodiment of the present invention.

FIGS. 6 and 7 show an image formation device equivalent to a fifth embodiment of the present invention. In the fifth embodiment, for the luminous energy detecting system in the first embodiment, there are provided a splitting/deflecting optical system 4B arranged between an imaging optical system 3 and photoconductor drums 5C, 5Y, 5M, 5K for splitting plural laser beams 2c, 2y, 2m, 2k of each color from a laser array 1 into the direction of an optical axis Z and a predetermined direction different from the direction of the optical axis Z and deflecting plural laser beams 2c, 2y, 2m, 2k of each color split into the predetermined direction so that principal rays of the laser beams 2 converge, and a photodetector 7 arranged at a point at which the principal rays split and deflected by the splitting/deflecting optical system 4B converge or in the vicinity for detecting the luminous energy of laser beams 2c, 2y, 2m, 2k of each color from the laser array 1.

The splitting/deflecting optical system 4B is composed of optical glass such as BK7, splits each laser beam 2c, 2y, 2m, 2k from the laser array 1 into transmitted light and reflected light and the ratio is determined depending upon the sensitivity of the photodetector 7 and the sensitivity of each surface of the photoconductor drums 5C, 5Y, 5M, 5K. In this embodiment, the ratio of transmitted light to reflected light is 1 to 4. Considering a case that there is dispersion among the polarization angles of each laser beam 2c, 2y, 2m, 2k, a special coat, for example a dielectric multilayer film, is applied to the surface of the splitting/deflecting optical system 4B. Even if dispersion between the polarization angles of S polarized light and P polarized light of laser beams 2c, 2y, 2m, 2k from the laser array 1 is any of 0 to 90°, dispersion in total luminous energy incident on the photodetector 7 can be reduced up to 1% or less owing to the above coat. For the splitting/deflecting optical system 4B, in this embodiment, a single beam splitter 40 having a toroidal surface (approximately an ellipsoid) in a horizontal scanning direction Y and having a cylindrical surface (a circular surface) in a vertical scanning direction X is used. The beam splitter 40 deflects laser beams 2c, 2y, 2m, 2k from the laser array 1 so that principal rays of laser beams 2c, 2y, 2m, 2k from the laser array 1 converge on the photodetector 7.

Next, the effect of the fifth embodiment will be described.

(a) As plural laser beams 2c, 2y, 2m, 2k emitted from each laser element group 11C, 11Y, 11M, 11K are respectively imaged on each photoconductor drum 5C, 5Y, 5M, 5K by a common imaging optical system 3, the optical system is miniaturized and the device is also miniaturized. Also, as plural laser elements 12 are arrayed in high density, the density of beam spots formed on the photoconductor drums 5C, 5Y, 5M, 5K is enhanced and high resolution is acquired. Also, as 1,200 pieces of laser elements 12 on one line in the horizontal scanning direction X are simultaneously driven, the recording of images is sped up.

(b) As the photodetector 7 is arranged at a point at which principal rays of plural laser beams 2c, 2y, 2m, 2k deflected by the beam splitter 40 converge or in the vicinity, plural laser beams 2c, 2y, 2m, 2k can be made incident on approximately the same position of the detection surface of the photodetector 7, detection errors caused by dispersion in the sensitivity of the photodetector 7 are reduced and as a result, the luminous energy can be precisely detected.

(c) As the detection area of the photodetector 7 may be small, a small-sized photodetector 7 can be used and as a mechanism for moving the photodetectors 7 is not required, the device can be miniaturized.

(d) As the arrangement of the beam splitter 40 and the photodetector 7 can be easily changed in accordance with the composition of the optical systems, the photodetector 7 can acquire a desired beam diameter and the required photodetector 7 can be easily acquired.

(e) As the luminous energy of each laser beam 2c, 2y, 2m, 2k which passes the imaging optical system 3 is measured, dispersion in luminous energy approximately equivalent to dispersion in luminous energy among laser beams 2c, 2y, 2m, 2k on the photoconductor drums 5C, 5Y, 5M, 5K can be precisely detected.

Figure 8:
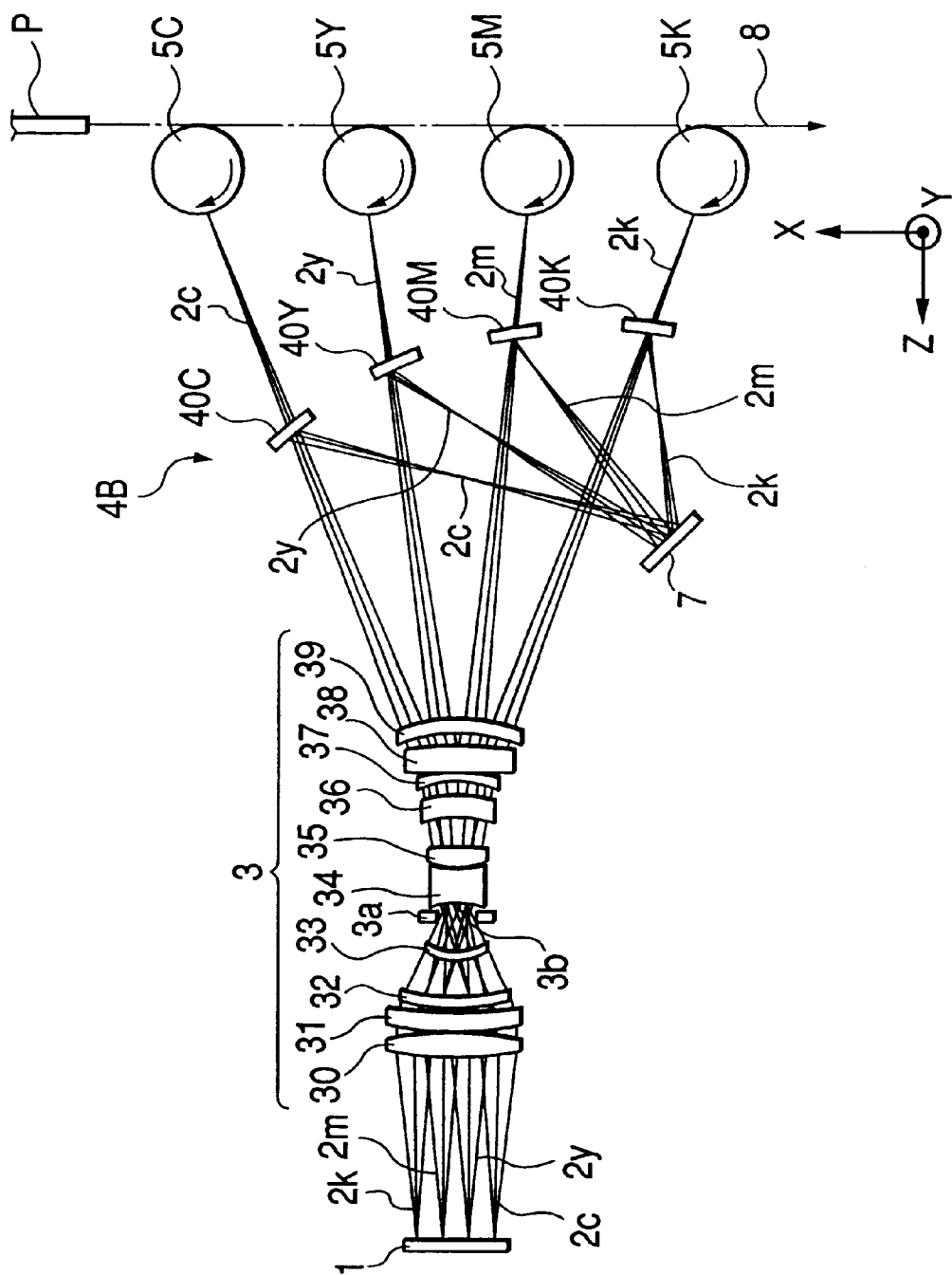
FIG. 8 shows the schematic configuration of an image formation device equivalent to a sixth embodiment of the present invention.

FIG. 8 shows an image formation device equivalent to a sixth embodiment of the present invention. In the sixth embodiment, for the splitting/deflecting optical system 4B, four beam splitters 40C, 40Y, 40M, 40K having a toroidal surface in a horizontal scanning direction Y and having a cylindrical surface in a vertical scanning direction X are arranged corresponding to each color of C, Y, M, K and the other part is composed as in the fifth embodiment. According to the above sixth embodiment, the luminous energy of all laser elements 12 can be precisely controlled by regulating the driving current of each laser element 12 based upon the luminous energy of each laser beam 2c, 2y, 2m, 2k detected by the photodetector 7. As only one photodetector 7 is required as in the fifth embodiment, the cost can be reduced.

Figure 9:
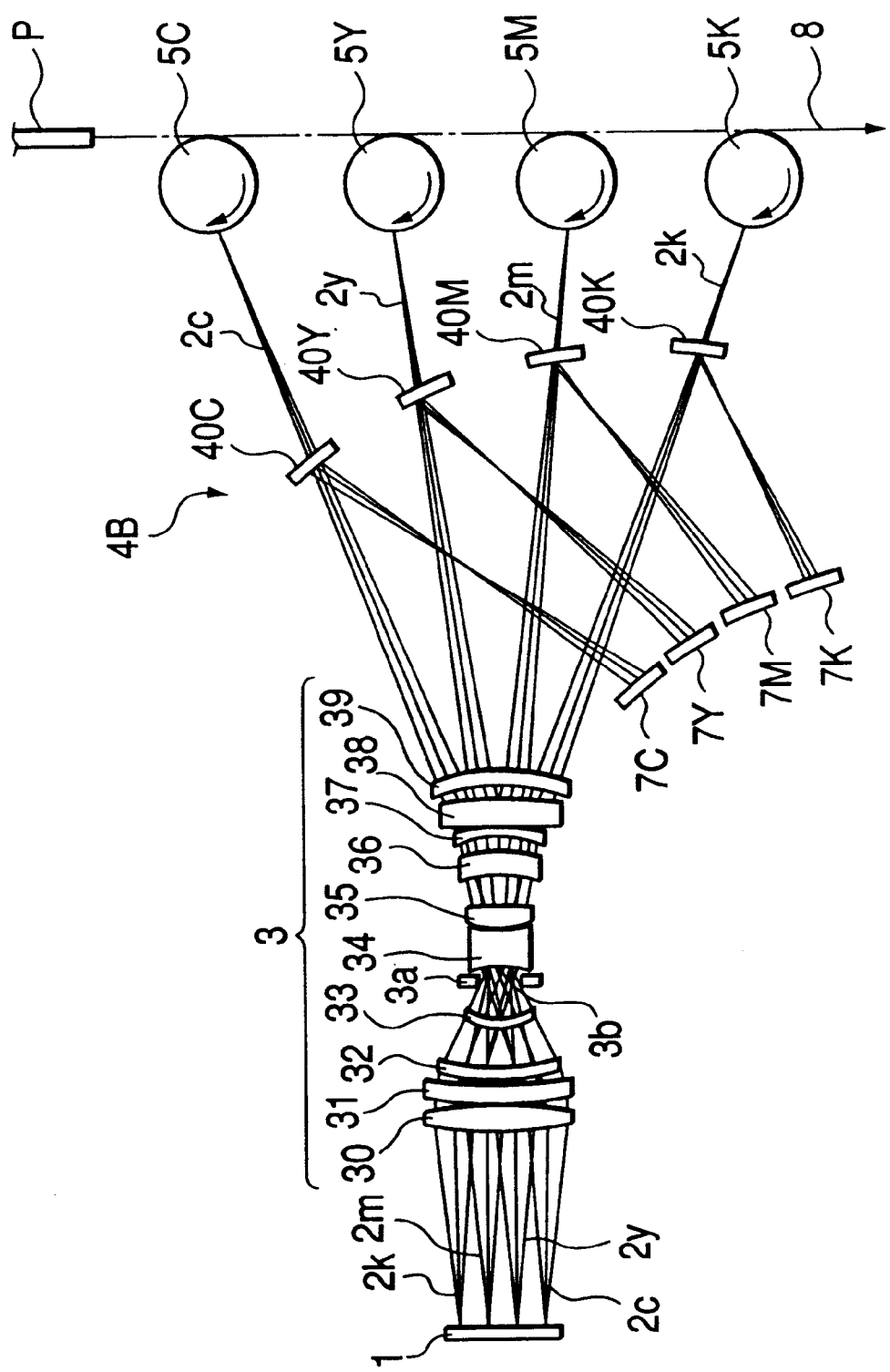
FIG. 9 shows the schematic configuration of an image formation device equivalent to an eighth embodiment of the present invention.

FIG. 9 shows an image formation device equivalent to an eighth embodiment of the present invention. In the eighth embodiment, four photodetectors 7C, 7Y, 7M, 7K are used differently from the sixth embodiment and the other part is composed as in the sixth embodiment. According to the eighth embodiment, the luminous energy of all laser elements 12 can be precisely controlled by regulating the driving current of each laser element 12 based upon the luminous energy of each laser beam 2c, 2y, 2m, 2k detected by the photodetectors 7C, 7Y, 7M, 7K. As the splitting/deflecting optical system 4B is composed of plural beam splitters 40C, 40Y, 40M, 40K, the working of each beam splitter 40C, 40Y, 40M, 40K is facilitated compared with a case that the splitting/deflecting optical system is composed of one beam splitter 40, and the level of the luminous energy of each color can be independently and easily set.

In the above fifth to ninth embodiments, a case that for the splitting/deflecting optical system, an optical mirror having a toroidal surface in the horizontal scanning direction Y and having a cylindrical surface in the vertical scanning direction X is used is described, however, an anamorphic mirror (a mirror composed of an aspheric surface symmetrical in two directions) may also be used and another aspheric mirror may also be used.

Figure 10:
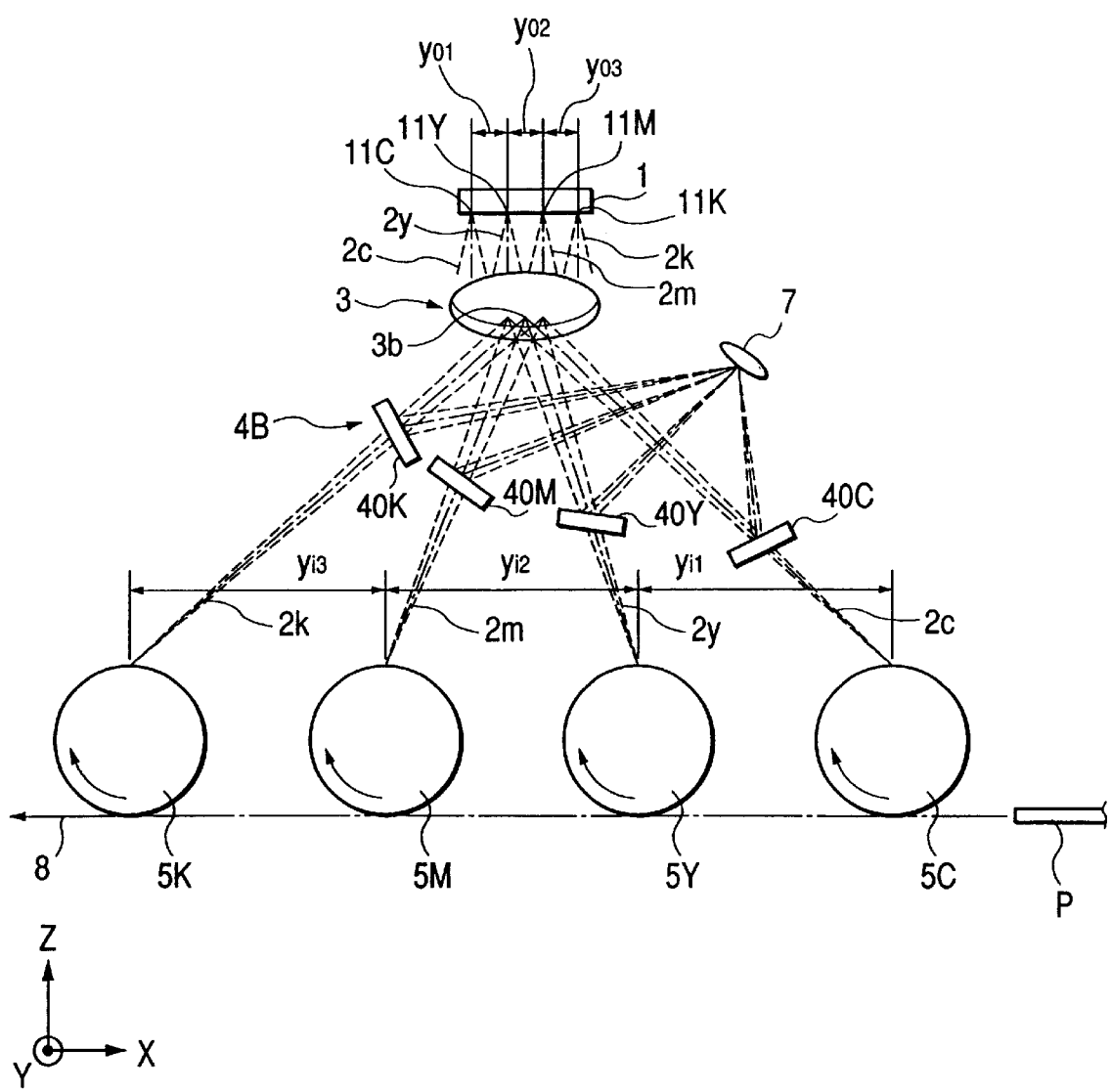
FIG. 10 shows the schematic configuration of an image formation device equivalent to a tenth embodiment of the present invention.

FIG. 10 shows an image formation device equivalent to a tenth embodiment of the present invention. In the tenth embodiment, pitch between each laser element group 11C, 11Y, 11M, 11K and pitch between each photoconductor drum 5C, 5Y, 5M, 5K are respectively set to a different value. That is, if pitch between the photoconductor drums 5C and 5Y, between 5Y and 5M and between 5M and 5K respectively in a vertical scanning direction X are respectively set to $y_{i1}$, $y_{i2}$ and $y_{i3}$ optical lateral magnification in the vertical scanning direction X of an imaging optical system 3 is set to ms and pitch in the vertical scanning direction X between the laser element groups 11C and 11Y, between 11Y and 11M and between 11M and 11K are respectively set to $y_{o1}$, $y_{o2}$ and $y_{o3}$, the laser element groups 11C, 11Y, 11M 11K and the photoconductor drums 5C, 5Y, 5M, 5K are arranged mutually in parallel in a horizontal scanning direction Y so that the following relationship is kept.

$y_{ok} = y_{ik}/ms$

The near field image of the laser element groups 11C, 11Y, 11M 11K is arrayed relatively in parallel on each exposed position on the photoconductor drums 5C, 5Y, 5M, 5K by arranging each laser element group 11C, 11Y, 11M, 11K and each photoconductor drum 5C, 5Y, 5M, 5K so that the respective images are mutually parallel in the horizontal scanning direction Y and a scanning line in the horizontal scanning direction Y can be acquired. At this time, the laser element groups 11C, 11Y, 11M 11K can be arranged on the same substrate 10 and variation in relative positions between each laser element group 11C, 11Y, 11M 11K is small. Laser beams 2c, 2y, 2m, 2k of each color of C, Y, M, K pass the imaging optical system 3 composed of the same optical elements, even if the position of the imaging optical system 3 is varied, the relative position of laser beams 2c, 2y, 2m, 2k of each color does not vary and therefore, a relative imaged position on a scanning surface does not vary, either.

According to the tenth embodiment, as the relative misregistration of an image position among the colors in a color image is greatly reduced by adopting the above arrangement of the laser element groups 11C, 11Y, 11M, 11K and the configuration of optical systems, the registration of a color image is satisfactory and a high quality of color print image can be acquired.

A developing device for each color different in size according to the quantity of used toner can be arranged between each photoconductor drum 5C, 5Y, 5M, 5K by respectively setting pitch $y_{i1}$, $y_{i2}$ and $y_{i3}$ in the vertical scanning direction X between each photoconductor drum 5C, 5Y, 5M, 5K to a desired value.

As a common imaging optical system 3 and a common photodetector 7 are used, the cost is reduced, the device is miniaturized, color registration is improved, chrominance can be improved and a high quality of color print image can be acquired.

Figure 11:
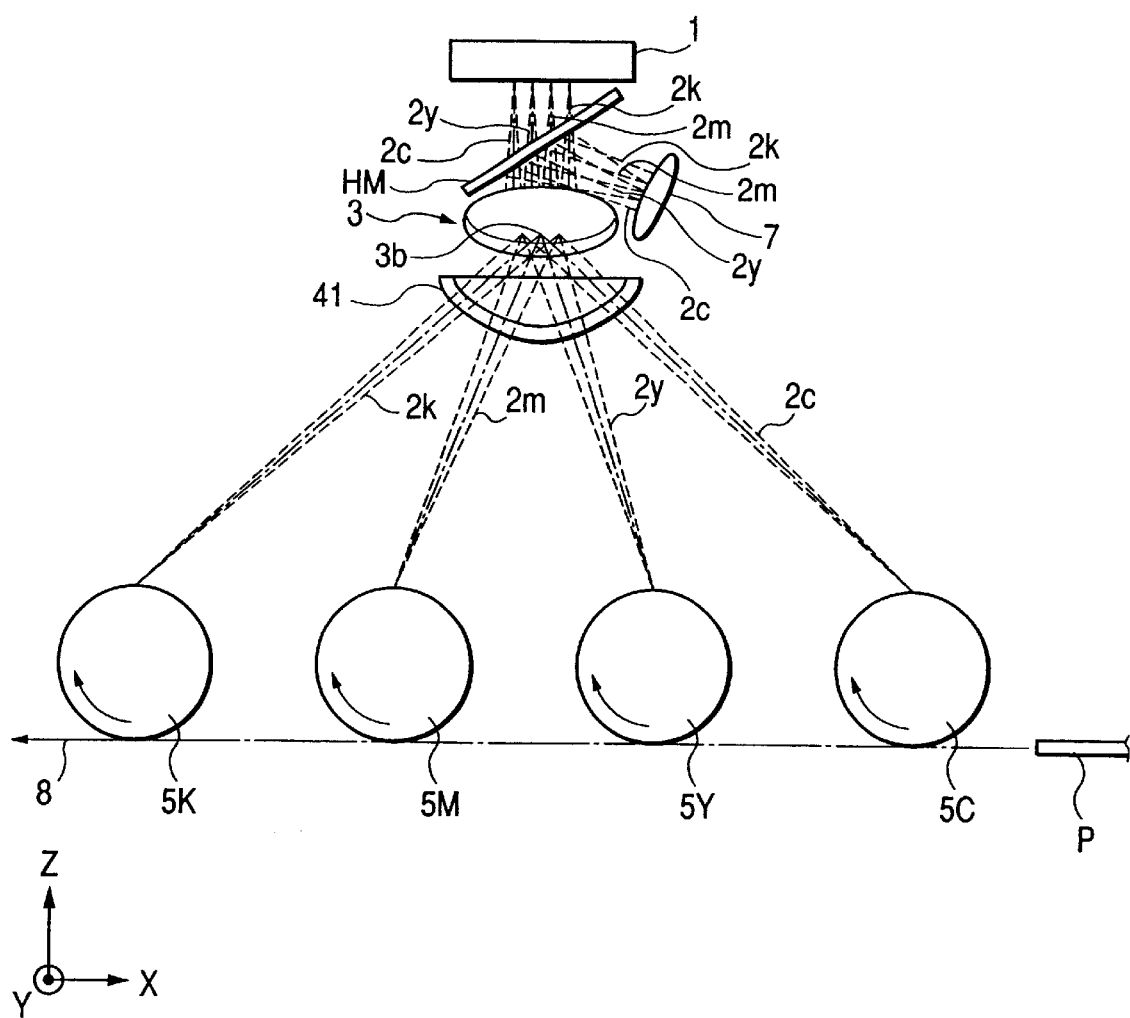
FIG. 11 shows the schematic configuration of an image formation device equivalent to an eleventh embodiment of the present invention.

FIG. 11 shows an image formation device equivalent to an eleventh embodiment of the present invention. In the eleventh embodiment, for the luminous energy detecting system, there are provided a concave half mirror 41 having a hemispherical surface arranged between an imaging optical system 3 and plural photoconductor drums 5C, 5Y, 5M, 5K, a planar half mirror HM arranged between a laser array 1 and the imaging optical system 3 and a photodetector 7 for detecting the luminous energy of laser beams 2c, 2y, 2m, 2k reflected by the half mirror HM. In the concave half mirror having a hemispherical surface 41, a reflector is formed of a dielectric multilayer film each layer of the same thickness and is arranged so that laser beams 2c, 2y, 2m, 2k which pass the imaging optical system 3 are vertically incident. A hemispherical surface for the concave half mirror having a hemispherical surface 41 is a part of a sphere having a point at which the outgoing pupil of the projection optical system 3 and the optical axis of the projection optical system 3 meet in the center.

In the eleventh embodiment composed as described above, when laser beams 2c, 2y, 2m, 2k are emitted from a laser array 1 approximately in parallel with the optical axis of the projection optical system 3, they are incident on the concave half mirror having a hemispherical surface 41 after they are transmitted in the planar half mirror HM and are incident on the projection optical system 3. A part of the laser beams 2c, 2y, 2m, 2k which are incident on the concave half mirror having a hemispherical surface 41 is transmitted in the concave half mirror having a hemispherical surface 41 and the other is reflected by the concave half mirror having a hemispherical surface 41. When laser beams 2c, 2y, 2m, 2k transmitted in the concave half mirror having a hemispherical surface 41 are respectively lead to photoconductor drums 5C, 5Y, 5M, 5K and as described above, a color image is formed. In the meantime, laser beams 2c, 2y, 2m, 2k reflected by the concave half mirror having a hemispherical surface 41 are transmitted in the projection optical system 3 again, are reflected by the planar half mirror HM, are lead to the photodetector 7 and after the luminous energy is individually detected, it is corrected as described above.

The effect of the above eleventh embodiment will be described. Generally, in a half mirror (a beam splitter), a reflector is formed by a dielectric multilayer film and when angles of incidence at which beams are incident on the mirror are different, reflectance varies in the case of a multilayer film of which each layer has the same thickness. In the tenth embodiment, as angles of incidence at which beams 2c, 2y, 2m, 2k from the laser element groups 11C, 11Y, 11M, 11K of each color are respectively incident on the beam splitters 40C, 40Y, 40M, 40K are different, half mirrors having different thicknesses are required to equalize reflectance. However, if many types of half mirrors different in thickness are used, there is a defect that the cost is increased. As shown in the above embodiment, angles of incidence at which beams 2c, 2y, 2m, 2k from laser element groups 11C, 11Y, 11M, 11K of each color are incident on the half mirror having a hemispherical surface 41 can be all equalized by installing the concave half mirror having a hemispherical surface 41. As for the planar half mirror HM, as each beam 2c, 2y, 2m, 2k is approximately parallel to the optical axis of the projection optical system 3, angles of incidence at which the beams 2c, 2y, 2m, 2k are incident on the half mirror HM are approximately equalized by inserting the planar half mirror HM. Therefore, the transmissivity of optical systems to the photodetector 7 can be equalized and precision in controlling luminous energy can be enhanced. As the luminous energy of laser beams 2c, 2y, 2m, 2k is detected after they are transmitted in the imaging optical system 3, the effect of eclipse by an angle of view of the imaging optical system 3 can be corrected.

Figure 12A:
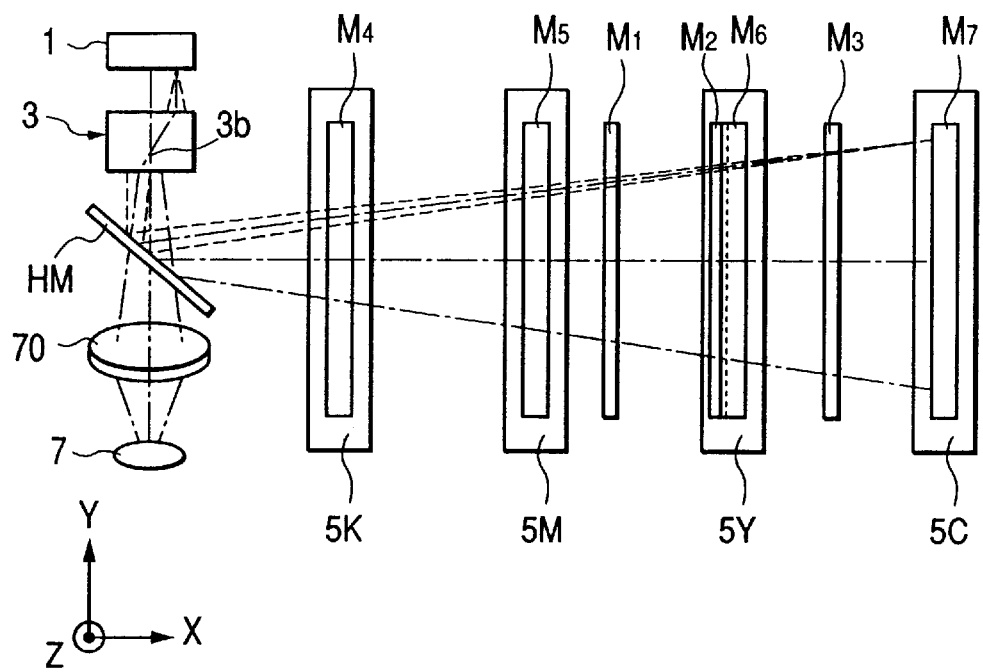
FIG. 12A shows the XY coordinate plane of an image formation device equivalent to a twelfth embodiment of the present invention and FIG. 12B shows the YZ coordinate plane.
Figure 12B:
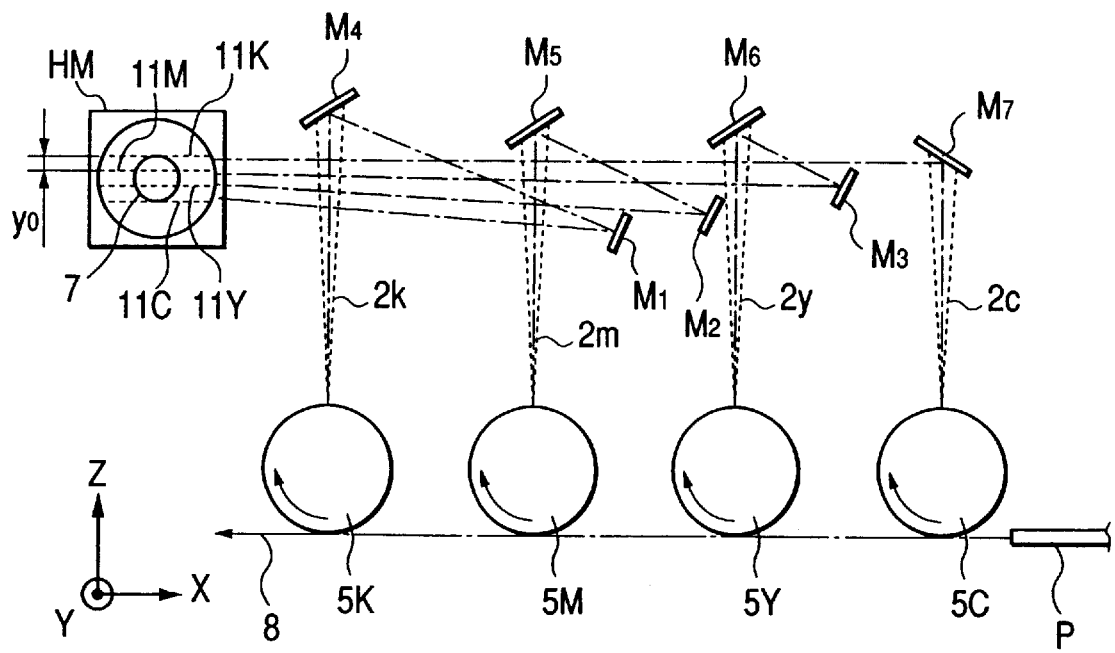

FIGS. 12A and 12B show an image formation device equivalent to a twelfth embodiment of the present invention. FIG. 12A shows an XY coordinate plane and FIG. 12B shows an XZ coordinate plane. In the twelfth embodiment, as in the first embodiment, a laser array 1, there are provided an imaging optical system 3 and plural photoconductor drums 5C, 5Y, 5M, 5K, and there are further provided a half mirror HM provided at the back of the imaging optical system 3 for reflecting and transmitting plural laser beams 2c, 2y, 2m, 2k of each color from the laser array 1 at a predetermined ratio, plural mirrors $M_1, M_2, M_3, M_4, M_5, M_6$ and $M_7$ for respectively leading laser beams 2c, 2y, 2m, 2k reflected by the half mirror HM to photoconductor drums 5C, 5Y, 5M, 5K, a condenser lens 70 for converging laser beams 2c, 2y, 2m, 2k transmitted in the half mirror HM and a photodetector 7 arranged on a focus of the condenser lens 70. The mirrors $M_1, M_2$ and $M_3$ are arranged in a position in which they do not interrupt another beam and are installed so that they reflect only desired beams 2y, 2m, 2k. Laser element groups 11C, 11Y, 11M, 11K in the laser array 1 are arranged in the direction Z of an optical axis in this embodiment as shown in FIG. 12B. Therefore, pitch $y_o$ in the direction Z of the optical axis between each laser element group 11C, 11Y, 11M, 11K corresponds to pitch $y_{o1}, y_2, y_3$ in a vertical scanning direction X between each laser element group 11C, 11Y, 11M, 11K shown in FIG. 10.

In the twelfth embodiment composed as described above, laser beams 2c, 2y, 2m, 2k emitted from the laser array 1 are incident on the half mirror HM via the imaging optical system 3. The laser beams 2c, 2y, 2m, 2k incident on the half mirror HM are reflected or transmitted at predetermined ratio. The laser beam 2c of C reflected by the half mirror HM is reflected by the mirror $M_7$ and led to the photoconductor drum 5C, the laser beam 2y of Y reflected by the half mirror HM is reflected by the mirrors $M_3$ and $M_6$ and led to the photoconductor drum 5Y, the laser beam 2m of M reflected by the half mirror HM is reflected by the mirrors $M_2$ and $M_5$ and led to the photoconductor drum 5M, the laser beam 2k of K reflected by the half mirror HM is reflected by the mirrors $M_1$ and $M_4$ and led to the photoconductor drum 5K. In the meantime, laser beams 2c, 2y, 2m, 2k of each color transmitted in the half mirror HM are focused by the condenser lens 70, are incident on the photodetector 7 and after the luminous energy is individually detected, it is corrected as described above.

According to the above twelfth embodiment, the device can be miniaturized by arranging the half mirror HM and the mirrors $M_1$ to $M_7$ according to the structure of the device.

The pitch $y_o$ in the vertical scanning direction X (the direction Z of an optical axis in this embodiment) between each laser element group 11C, 11Y, 11M, 11K and the magnification of the projection optical system 3 can be determined without depending upon pitch in the vertical scanning direction X between each photoconductor drum 5C, 5Y, 5M, 5K.

As pitch $y_o$ between each laser element group 11C, 11Y, 11M, 11K can be set so that it is relatively narrow, the angle of view in the vertical scanning direction X (the direction Z of the optical axis in this embodiment) of the projection optical system 3 can be set so that it is narrow and the projection optical system which is low-priced though the performance is relatively low can be used.

Figure 13:
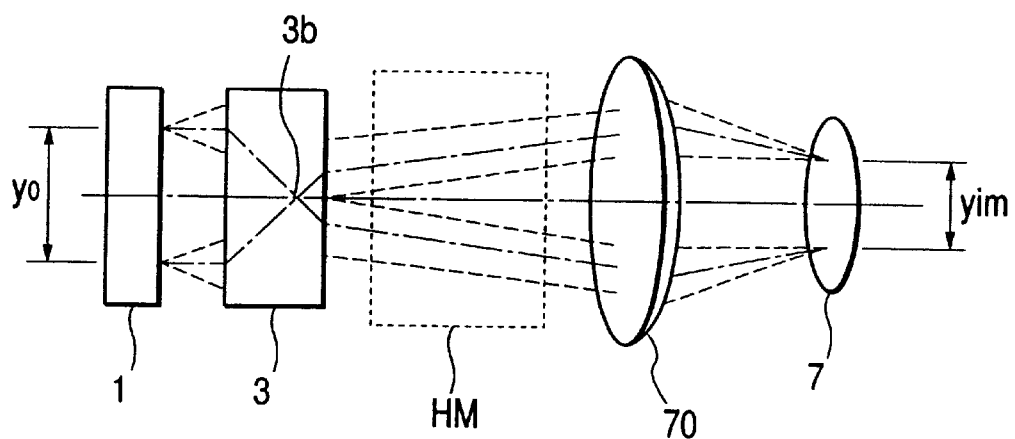
FIG. 13 shows a state of focusing on a photodetector in the twelfth embodiment.

FIG. 13 shows a state of focusing on the photodetector 7 in the twelfth embodiment. The near field image of the laser element groups 11C, 11Y, 11M, 11K is projected on the light receiving surface of the photodetector 7 by the optical system composed of the imaging optical system 3 and the condenser lens 70. If the lateral magnification of the optical system to the photodetector 7 is mc and the pitch between each laser element group 11C, 11Y, 11M, 11K is $y_o$, the pitch $y_{im}$ on the photodetector 7 is "$y_{im} = y_o^{xmc}$" and the lateral magnification mc can be set to a small value by using a lens of which the focal length is relatively short for the condenser lens 70. Particularly, when the lateral magnification mc is smaller than equivalence, $y_{im}$ is smaller than the pitch $y_o$ between each laser element group 11C, 11Y, 11M, 11k and the photodetector 7 can be miniaturized. Optical path length from the condenser lens 70 to the photodetector 7 can also be reduced and the device can be miniaturized.

Figure 14:
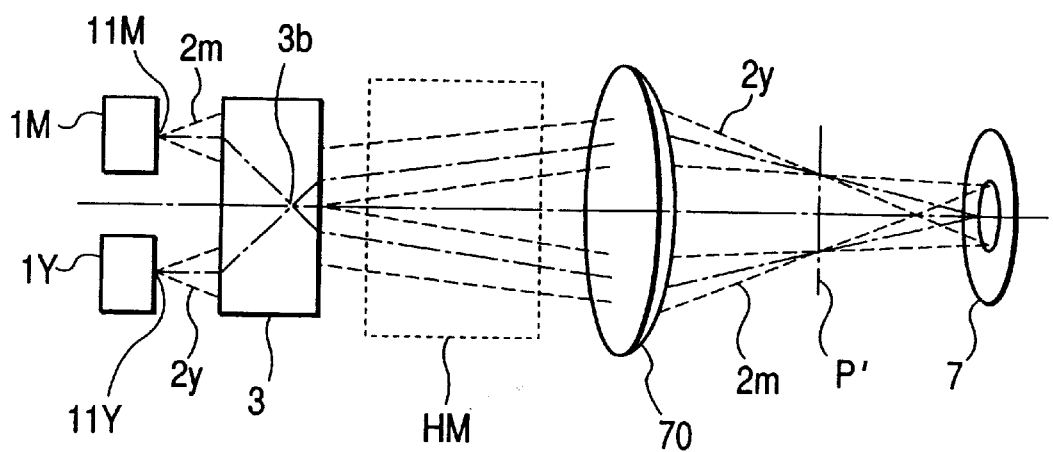
FIG. 14 shows a state of focusing on a photodetector in a thirteenth embodiment of the present invention.

FIG. 14 shows a state of focusing on a photodetector 7 in a thirteenth embodiment of the present invention. FIG. 14 shows a case of two colors Y and M. In the thirteenth embodiment, the position of the photodetector 7 is not a position in which laser beams 2y and 2m are focused by a condenser lens 70, that is, it is not a geometrically conjugate position P' to laser element groups 11Y and 11M but a position defocused so that laser beams 2y and 2m are not projected outside a light receiving area and the photodetector is arranged in a position in which principal rays of laser beams 2y and 2m from each laser element group 11Y and 11M cross. According to the thirteenth embodiment, laser beams 2y and 2m from laser arrays 1Y and 1M are dispersed in the light receiving area of the photodetector 7 by arranging the photodetector 7 in the defocused position and errors due to the unevenness of sensitivity in the light receiving area of measurement in measuring luminous energy can be reduced. As the photodetector 7 is arranged in a position in which principal rays of laser beams 2y and 2m from the laser arrays 1Y and 1M cross, the luminous energy can be detected in the same position of the light receiving area of the photodetector 7 and as shown in FIG. 13, errors due to the unevenness of sensitivity in the light receiving area in measuring luminous energy can be further reduced according to this method compared with a case that beams are focused in different positions in the light receiving area of the photodetector 7. Owing to such a configuration, errors of the relative setting of the luminous energy of laser beams for each color can be reduced and a color print in which color difference is small can be acquired. In FIG. 14, for simplification, the two laser element groups 11Y and 11M are shown as a light source, however, the present invention can also be similarly applied to a case such as the four laser element groups 11C, 11Y, 11M, 11K are provided as shown in FIG. 3.

Figure 15A:
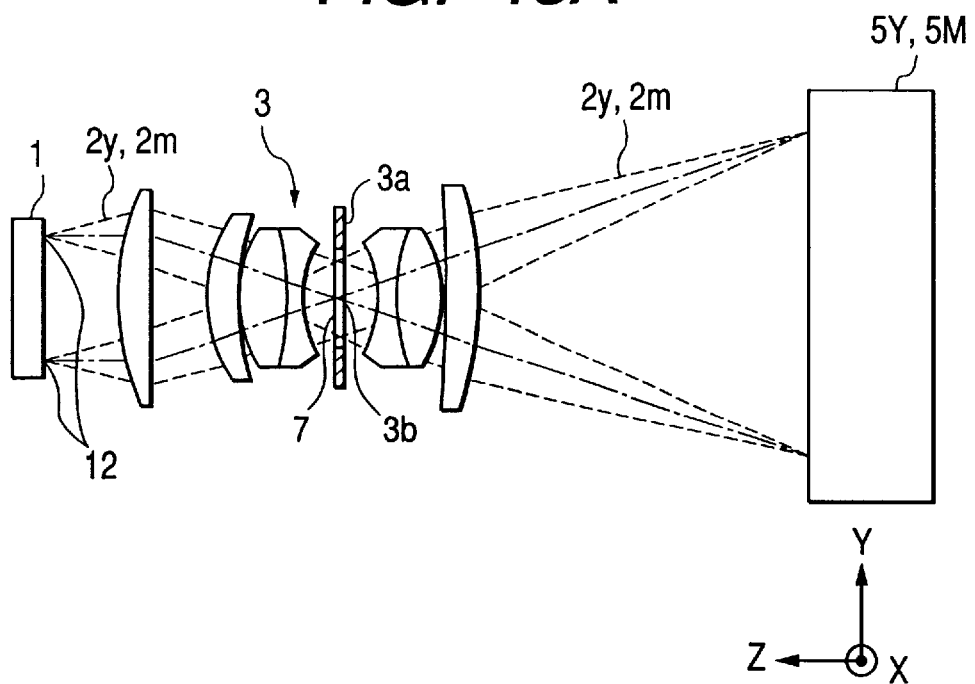
FIG. 15A shows the YZ coordinate plane of an image formation device equivalent to a fourteenth embodiment of the present invention and FIG. 15B shows the XZ coordinate plane.
Figure 15B:
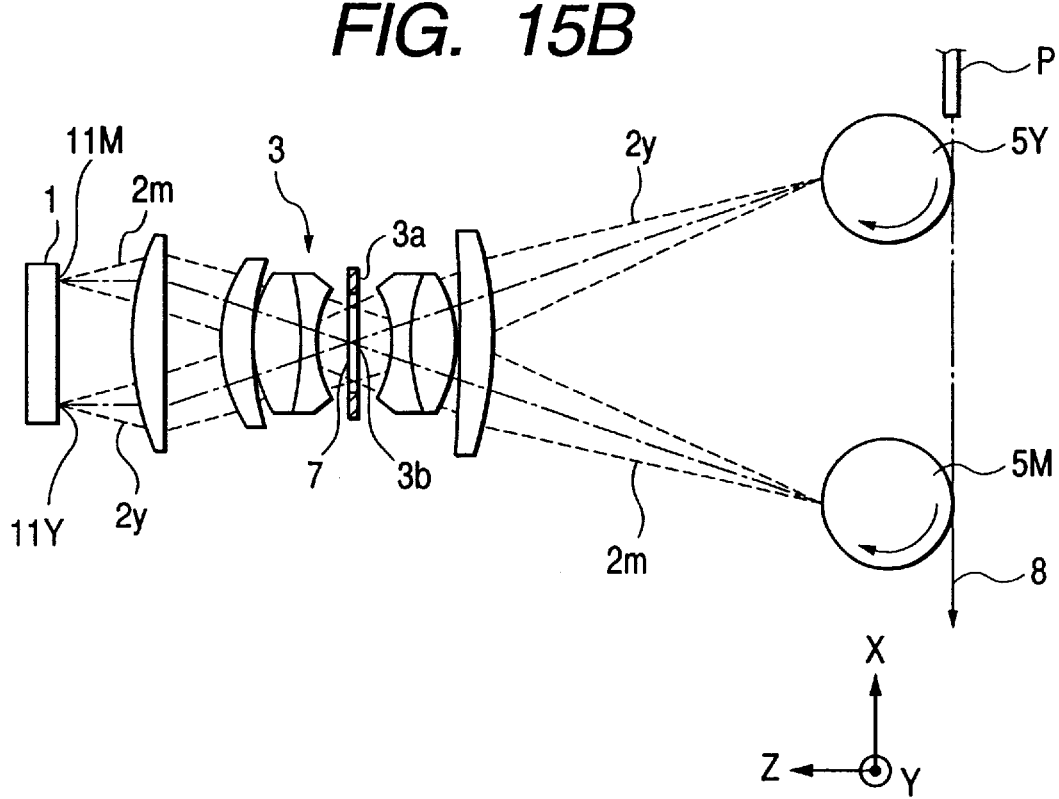

FIGS. 15A and 15B show an image formation device equivalent to a fourteenth embodiment of the present invention. FIGS. 15 show a case of two colors Y and M. In the fourteenth embodiment, there are provided a laser array 1 for respectively emitting plural laser beams 2y and 2m modulated based upon picture signals of the two colors from laser element groups 11Y and 11M, plural photoconductor drums 5Y and 5M provided corresponding to the two colors Y and M and rotated in a direction shown by arrows, an imaging optical system 3 which is a magnifying optical system for imaging plural laser beams 2y and 2m of each color emitted from the laser array 1 on the surface of the corresponding photoconductor drums 5Y and 5M and forming an electrostatic latent image on the surface of the photoconductor drums 5Y and 5M and a photodetector 7 arranged inside a diaphragm 3a provided at an aperture of the imaging optical system 3.

For the imaging optical system 3, an Orthometar lens group, a Xenotar lens group and a double Gauss lens group can be used and each group is composed so that principal rays of laser beams 2y and 2m emitted from each laser element 12 cross on a focus 3b in the vicinity of an aperture of the imaging optical system 3. A field lens as a focusing part for focusing, plural laser beams 2y and 2m from the laser array 1 on a common focus 3b may also be provided before the imaging optical system 3.

Figure 16A:
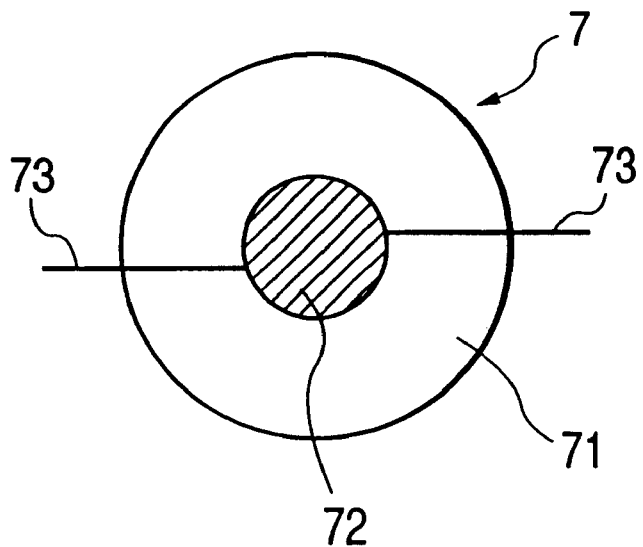
FIG. 16A is a front view showing a photodetector in the fourteenth embodiment and FIG. 16B is its sectional view.
Figure 16B:
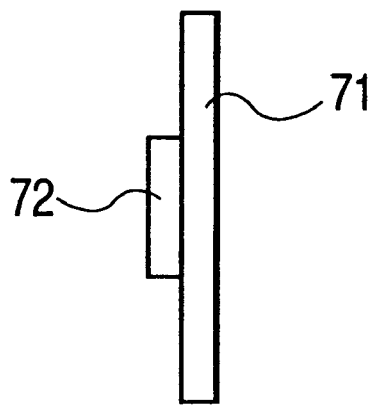

FIGS. 16A and 16B show the photodetector 7 in the fourteenth embodiment. As for the photodetector 7, a light receiving unit 72 is formed in the center on an optical glass substrate 71 and is connected to a luminous energy monitoring circuit not shown via an electrode 73 led from the light receiving unit 72 and similarly located on the optical glass substrate 71. All laser elements 12 are sequentially driven, a part of beams 2y and 2m incident on the aperture of the imaging optical system 3 is received by the light receiving unit 72 of the photodetector 7, the luminous energy is individually detected and is corrected as described above.

According to the above fourteenth embodiment, as the luminous energy of all laser beams 2y and 2m from all the laser element groups 11Y and 11M can be detected by only one photodetector 7, errors of the relative setting of luminous energy between laser elements and between laser element groups are reduced and the quality of an image such as the reproducibility of color difference can be improved. As an optical system for detecting luminous energy is not required, the device can be miniaturized and the cost can be reduced. In FIG. 15, for simplification, the two laser element groups 11Y and 11M are shown as a light source, however, the present invention can also be similarly applied to a case such as the four laser element groups 11C, 11Y, 11M, 11K are provided as shown in FIG. 3.

Figure 17:
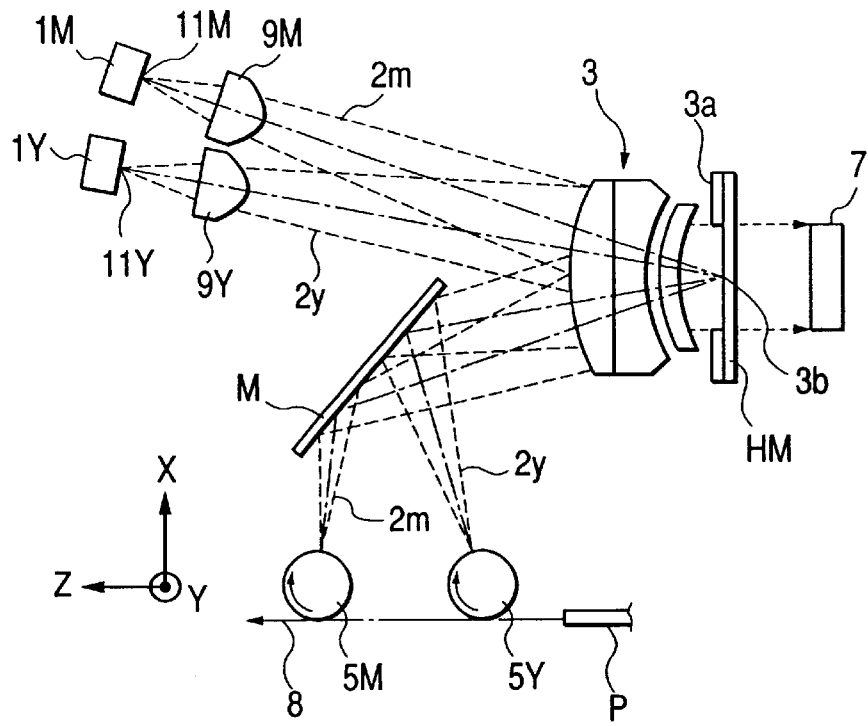
FIG. 17 shows the schematic configuration of an image formation device equivalent to a fifteenth embodiment of the present invention.

FIG. 17 shows an image formation device equivalent to a fifteenth embodiment of the present invention. FIG. 17 shows a case of two colors Y and M. In the fifteenth embodiment, a laser array 1Y provided with a laser element group 11Y corresponding to Y, a laser array 1M provided with a laser element group 11M corresponding to M, two field lenses 9Y and 9M for focusing laser beams 2y and 2m from the laser arrays 1Y and 1M on a common focus 3b, a single imaging optical system 3 provided before the focus 3b and composed of a divided half of an Orthometar lens group, a diaphragm 3a arranged in the vicinity of the focus 3b, a common half mirror HM arranged in the vicinity of the focus 3b for reflecting or transmitting laser beams 2y and 2m at a predetermined ratio and a common mirror M for reflecting laser beams 2y and 2m reflected by the half mirror HM to lead them onto photoconductor drums 5Y and 5M are provided. The plural laser arrays 1Y and 1M installed closely and the field lenses 9Y and 9M installed closely are respectively fixed in a solid housing so that mutual positions are not dislocated.

In the fifteenth embodiment composed as described above, laser beams 2y and 2m emitted from the laser arrays 1Y and 1M corresponding to each color are focused by the field lenses 9Y and 9M so that principal rays cross and are incident on the imaging optical system 3. Principal rays of laser beams 2y and 2m from the laser arrays 1Y and 1M corresponding to each color cross in the vicinity of an aperture of the imaging optical system 3, a part is reflected by the half mirror HM and passes the imaging optical system 3 again, the optical path is turned by the mirror M and the above part is imaged on the photoconductor drums 5Y and 5M of each color. Laser beams 2y and 2m transmitted in the half mirror HM are incident on the common photodetector 7 and the luminous energy is individually detected.

According to the above fifteenth embodiment, as the relative position of beams 2y and 2m of each color is unchanged even if the position of the imaging optical system 3 and the mirror M varies because of the change of temperature, vibration and the like, the relative position of beams 2y and 2m respectively projected on the photoconductor drums 5Y and 5M of each color is unchanged and satisfactory color registration in a color print can be acquired.

As the optical system is composed so that principal rays of beams 2y and 2m from plural laser arrays 1 cross in the vicinity of the aperture of the imaging optical system 3, the luminous energy of each beam from the plural laser arrays 1Y and 1M can be measured by the single photodetector 7 and errors in correcting luminous energy between plural laser arrays 1Y and 1M can be reduced. In FIG. 17, for simplification, the two laser element groups 11Y and 11M are shown as a light source, however, the present invention can also be similarly applied to a case such as the four laser element groups 11C, 11Y, 11M, 11K are provided as shown in FIG. 3.

Figure 18:
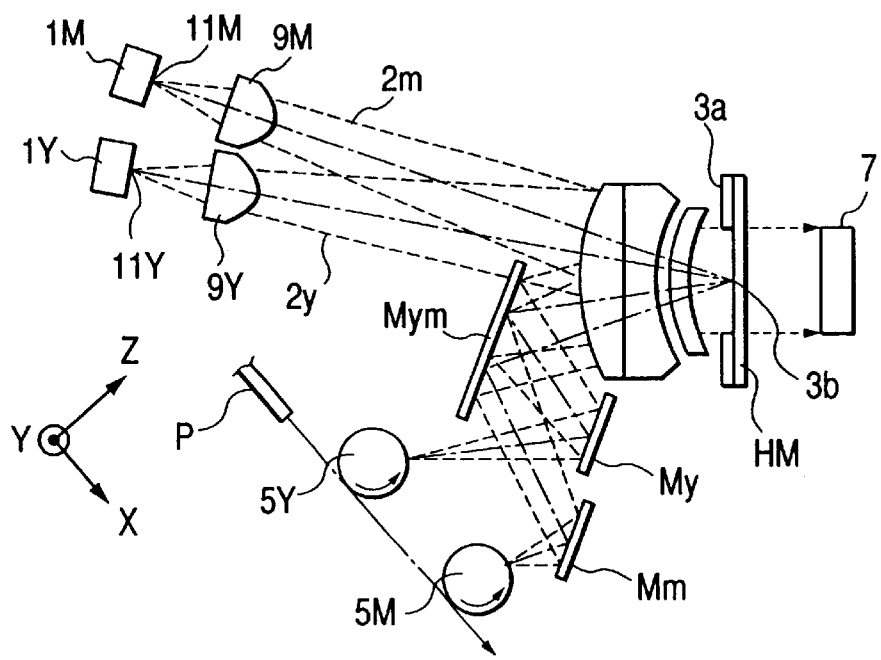
FIG. 18 shows the schematic configuration of an image formation device equivalent to a sixteenth embodiment of the present invention.

FIG. 18 shows an image formation device equivalent to a sixteenth embodiment of the present invention. In the sixteenth embodiment, the mirror M in the fifteenth embodiment is divided into a common mirror Mym and mirrors My and Mm provided corresponding to each color. Laser beams 2y and 2m which are reflected by a half mirror HM and pass an imaging optical system 3 are reflected by the common mirror Mym, the laser beam 2y of Y is reflected by the mirror My and is imaged on the surface of a photoconductor drum 5Y, the laser beam 2m of M is reflected by the mirror Mm and is imaged on the surface of a photoconductor drum 5M.

According to the sixteenth embodiment, as the relative position of beams 2y and 2m of each color is unchanged even if the position of the common imaging optical system 3 and the mirror Mym varies because of the change of temperature, vibration and the like, satisfactory color registration in a color print can be acquired. As beams 2y and 2m are respectively imaged on the photoconductor drums 5Y and 5M via the plural mirrors Mym, My and Mm, the degree of the freedom of layout is increased. In FIG. 18, for simplification, the two laser element groups 11Y and 11M are shown as a light source, however, the present invention can also be similarly applied to a case such as the four laser element groups 11C, 11Y, 11M, 11K are provided as shown in FIG. 3.

Figure 19:
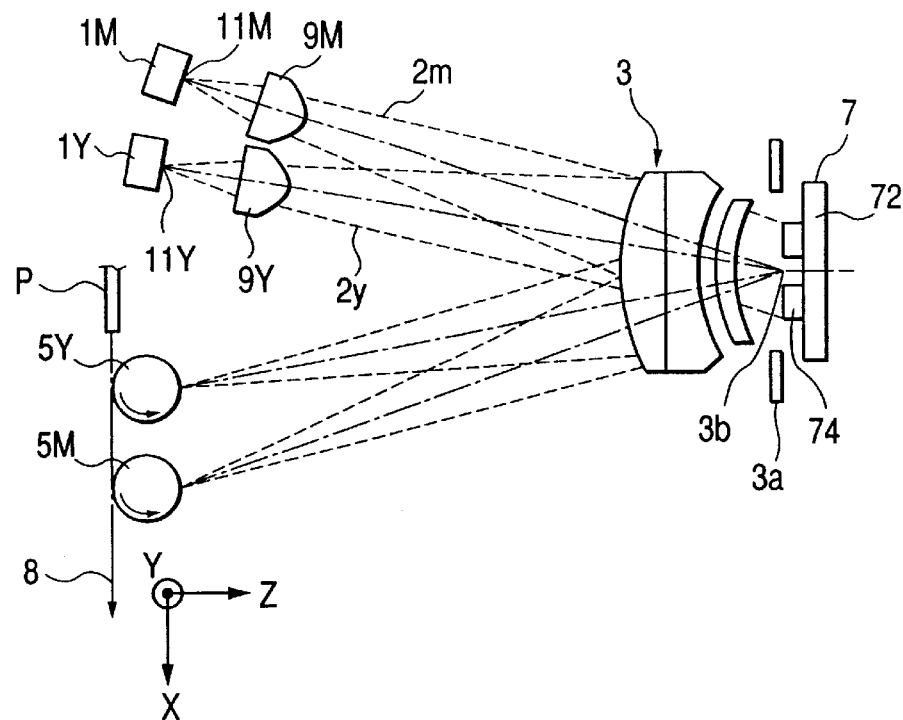
FIG. 19 shows the schematic configuration of an image formation device equivalent to a seventeenth embodiment of the present invention.

FIG. 19 shows an image formation device equivalent to a seventeenth embodiment of the present invention. In the seventeenth embodiment, differently from the fifteenth embodiment, the mirror M is omitted, the structure of a photodetector 7 is changed and the other part is similar to that in the fifteenth embodiment. The photodetector 7 is provided with a circular light receiving unit 72 and a mirror 74 arranged in a ring on the side on which laser beams 2y and 2m are incident of the light receiving unit 72. Laser beams 2y and 2m incident on the mirror 74 are reflected by the mirror 74, are transmitted in an imaging optical system 3 again, respectively reach on photoconductor drums 5Y and 5M, and respectively imaged on each surface of the photoconductor drums 5Y and 5M. In the meantime, the luminous energy of beams 2y and 2m incident on the light receiving unit 72 through an aperture 74a of the mirror 74 is individually detected and afterward, the luminous energy is corrected.

According to the seventeenth embodiment, the similar effect to that in the fifteenth embodimentis acquired. In FIG. 19, for simplification, the two laser element groups 11Y and 11M are shown as a light source, however, the present invention can also be similarly applied to a case such as the four laser element groups 11C, 11Y, 11M, 11K are provided as shown in FIG. 3.

Figure 20:
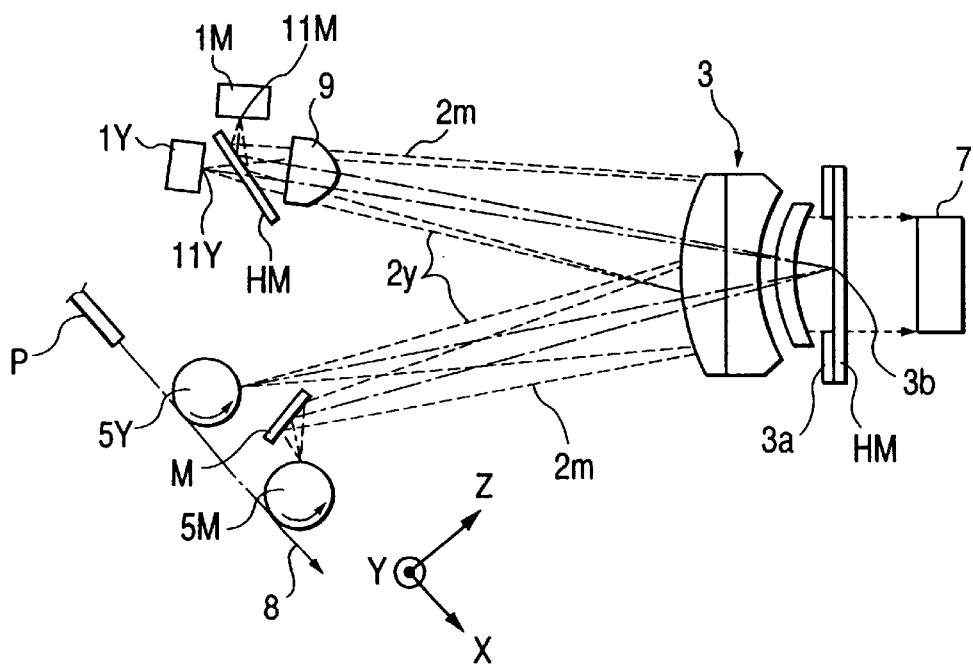
FIG. 20 shows the schematic configuration of an image formation device equivalent to an eighteenth embodiment of the present invention.
Figure 21:
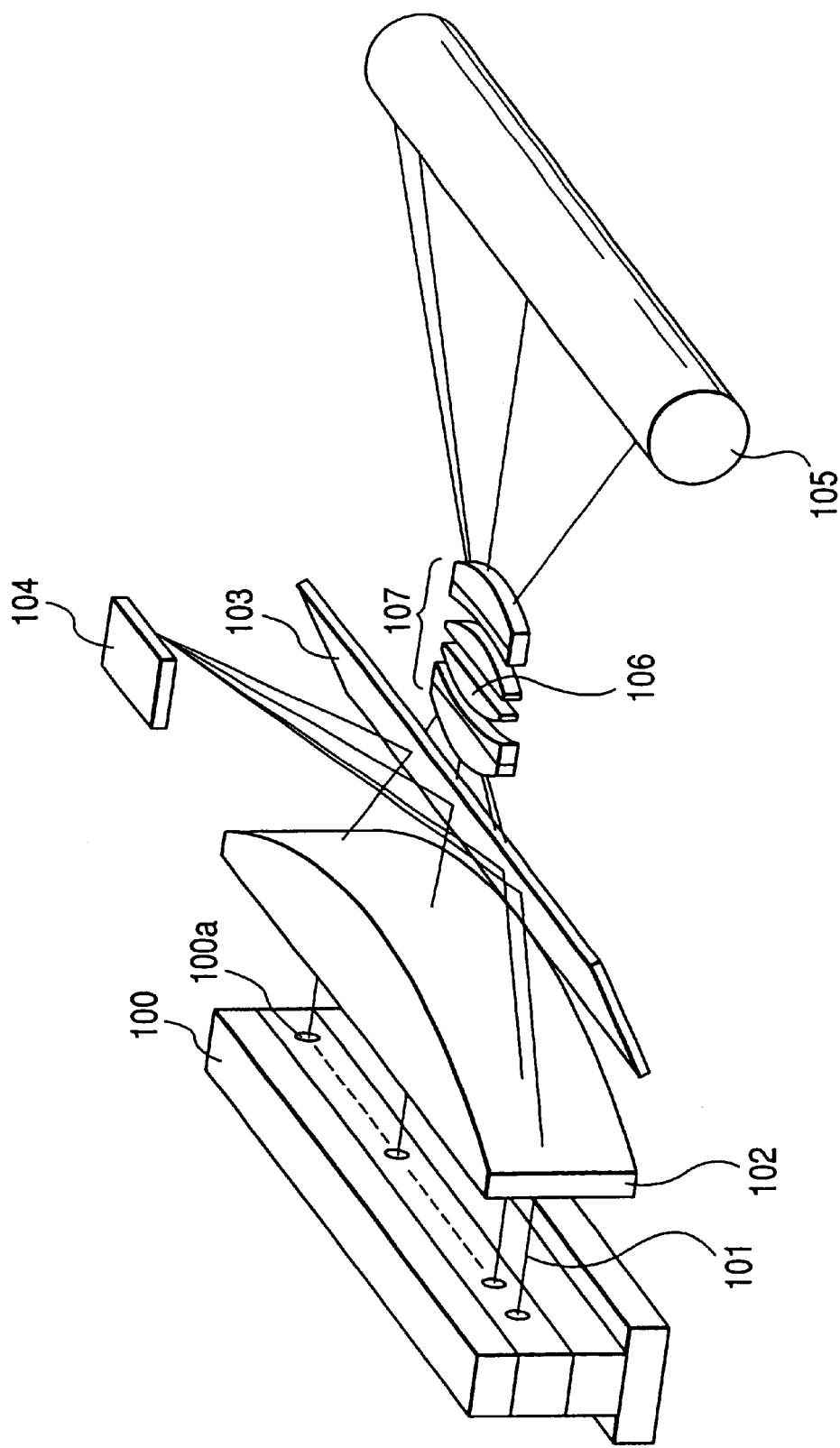
FIG. 21 shows a conventional type image formation device.
Figure 22A:
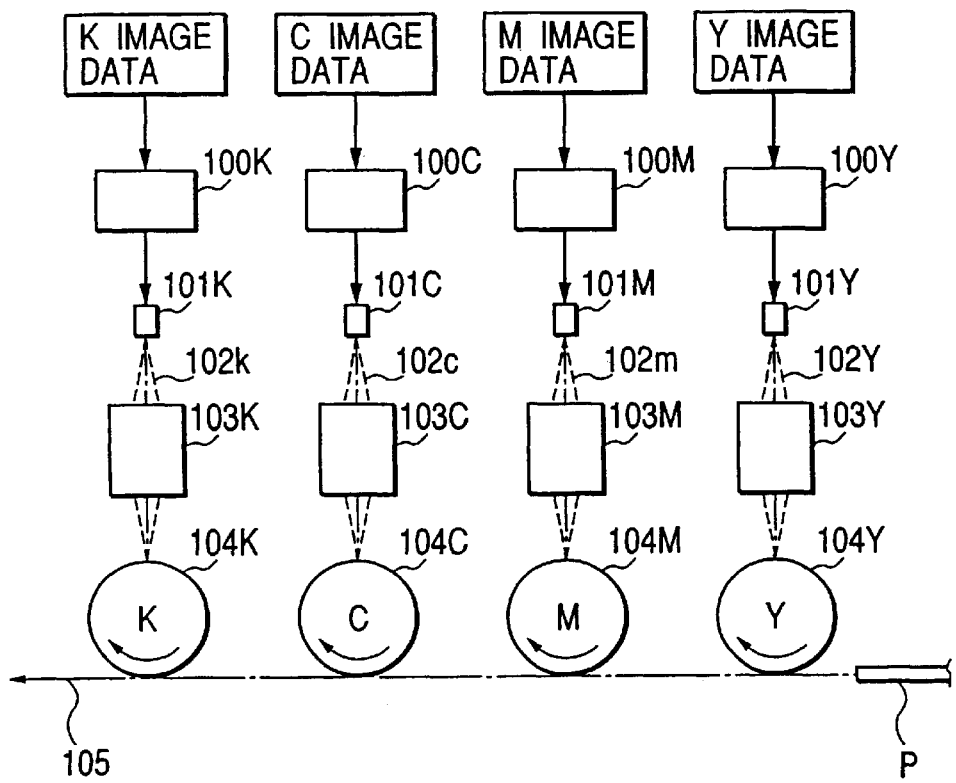
FIG. 22A shows another conventional type image formation device and FIG. 22B is a sectional view showing the structure for mounting its LED array and a projection optical system.
Figure 22B:
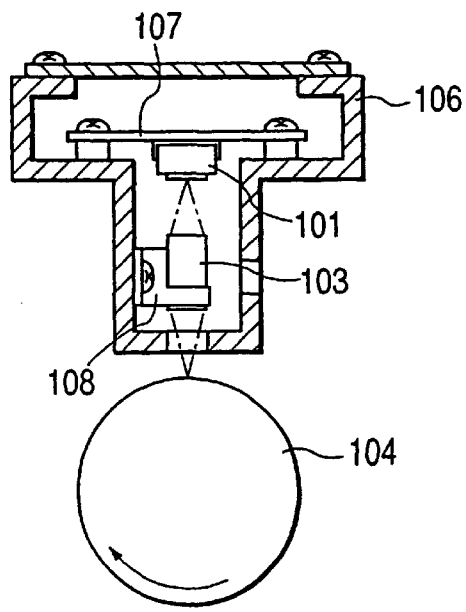

FIG. 20 shows an image formation device equivalent to an eighteenth embodiment of the present invention. In the eighteenth embodiment, a common field lens 9 is provided, a half mirror HM is arranged between a laser array 1Y and the field lens 9 and a mirror M is arranged before a photoconductor drum 5M. A laser beam 2y from one laser array 1Y is transmitted in the half mirror HM, is incident on the common field lens 9, a laser beam 2m from the other laser array 1M is reflected by the half mirror HM and is incident on the common field lens 9. The laser beams 2y and 2m incident on the common field lens 9 are focused on a focus 3b. A part of the laser beam 2y from one laser array 1Y is reflected by the half mirror HM in the vicinity of the focus 3b and is led to the photoconductor drum 5Y, a part of the laser beam 2m from the other laser array 1M is reflected by the half mirror HM in the vicinity of the focus 3b and is led to the photoconductor drum 5M after it is reflected by the mirror M. The laser beams 2y and 2m transmitted in the half mirror HM in the vicinity of the focus 3b are incident on the photodetector 7.

According to the above seventeenth embodiment, as the relative position of beams 2y and 2m of each color is unchanged even if the position of the common half mirror HM, the field lens 9 and the imaging optical system 3 varies because of the change of temperature, vibration and the like, color registration can be enhanced and a high quality of color pint image can be acquired. In FIG. 20, for simplification, the two laser element groups 11Y and 11M are shown as a light source, however, the present invention can also be similarly applied to a case such as the four laser element groups 11C, 11Y, 11M 11K are provided as shown in FIG. 3.

In the above first to eighteenth embodiments, as a way of regulating an exposed quantity based upon measured luminous energy, the case that current for driving the laser element is controlled is described, however, if exposure time is controlled, the similar effect can also be acquired. If the exposed quantity is controlled by regulating the number of pulses in case exposure is performed using a pulse short in emission time, the similar effect can also be acquired.

Also, in the above first to eighteenth embodiments, the image formation device provided with the laser array or the laser arrays as a light source is described, however, the present invention can also be applied to an image formation device provided with an LED array or a fluorescent array as a light source.

EXAMPLES

A first example corresponding to the first embodiment will be described below. In the first example, the optical mirrors 60C, 60Y, 60M, 60K having a toroidal surface the radius of curvature of which is 185.00 mm and the conic constant of which is −0.3 in a horizontal scanning direction Y and having a cylindrical surface of which the radius of curvature is 400 mm in a vertical scanning direction X are used. The distance from the imaging optical system 3 to the beam splitter 4 is set to 80 mm in the center, the distance from the beam splitter 4 to the optical mirror 60 is set to 220 mm on the average and the distance from the optical mirrors 60C, 60Y, 60M, 60K to the photodetectors 7C, 7Y, 7M, 7K is set to 134 mm on the average. As a result, laser beams 2c, 2y, 2m, 2k from the optical mirrors 60C, 60Y, 60M, 60K can be made respectively incident in the range of 10 mm in diameter on the photodetectors 7C, 7Y, 7M, 7K. Therefore, the photodetectors 7C, 7Y, 7M, 7K each effective diameter of which is approximately 15 mm can be used and errors of detection due to dispersion in the sensitivity among the photodetectors 7C, 7Y, 7M, 7K can be reduced.

A second example corresponding to the fifth embodiment will be described below. In the second example, the beam splitter 40 having a toroidal surface the radius of curvature of which is 185.00 mm and the conic constant of which is −0.3 in a horizontal scanning direction Y and having a cylindrical surface the radius of curvature of which is 400 mm in a vertical scanning direction X is used. The distance from the imaging optical system 3 to the beam splitter 40 is set to 200 mm in the center and the distance from the beam splitter 40 to the photodetector 7 is set to 134 mm on the average. As a result, laser beams 2c, 2y, 2m, 2k from the beam splitter 40 can be made incident in the range of 10 mm in diameter on the photodetector 7. Therefore, the photodetector 7 of which the effective diameter is approximately 15 mm can be used and errors of detection due to dispersion in the sensitivity of the photodetector 7 can be reduced.

As described above, according to the image formation device according to the present invention, as the light source array composed of the light emitting elements of which the density can be enhanced and the simultaneous driving of which is enabled is used for a light source and a light beam from each light emitting element is imaged on each image carrier by the common imaging optical system, the cost can be reduced and the device can be miniaturized, and even if the relative mounting position of the light source and the optical element is dislocated, the deterioration of color registration can be reduced and a high resolution of color image can be formed at high speed.

Also, a color image having uniform quality can be formed by controlling the driving condition of the plural light emitting elements based upon the luminous energy detected by the detecting part of plural light beams.

What is claimed is:

1. An image formation device for forming a color image composed of plural colors, comprising:

plural light source arrays provided corresponding to said plural colors and provided with a plural light emitting elements arrayed at least in a horizontal scanning direction for emitting plural light beams modulated based upon picture signals corresponding to said plural colors from said plural light emitting elements;

plural image carriers provided corresponding to said plural colors and exposed by said plural light beams from said plural light source arrays on each of which a latent image is formed by moving each image carrier in a vertical scanning direction; and a projection optical system for respectively imaging said plural light beams from said plural light source arrays on said plural image carriers and forming said latent image after the projection optical system focuses said plural light beams from said plural light source arrays on a common focus of a single lens of the projection optical system, wherein the portion of the optical system facing the light emitting elements is telecentric.

2. The image formation device according to claim 1, wherein:

in each of said plural light source arrays, said plural light emitting elements corresponding to each of said plural colors are arranged on the same substrate.

3. The image formation device according to claim 1, wherein:

said plural light source arrays and said plural image carriers are arranged in parallel in said horizontal scanning direction.

4. The image formation device according to claim 1, wherein:

in said plural light source arrays and said plural image carriers, a pitch in said vertical scanning direction between said plural image carriers is set to a different value; and the pitch in said vertical scanning direction between said plural light emitting elements corresponding to said plural colors of said plural light source arrays is set according to said different value set in relation to said plural light source arrays.

5. An image formation device according to claim 1, wherein:

said projection optical system comprises a focusing part that focuses said plural light beams from said plural light source arrays on said common focus and an imaging optical system arranged on said focus or in the vicinity thereof for respectively imaging said plural light beams focused by said focusing part on said plural image carriers.

6. The image formation device according to claim 1, wherein:

said projection optical system comprises:

a focusing part that focuses said plural light beams from said plural light source arrays on said common focus;

a divided half of an orthometar lens group arranged on said focus or in the vicinity thereof for respectively imaging said plural light beams focused by said focusing part on said plural image carriers; and an optical mirror arranged on said focus or in the vicinity thereof for reflecting said plural light beams from the divided half of said orthometar lens group to lead said plural light beams onto said plural image carriers.

7. The image formation device according to claim 6, wherein:

said optical mirror has an aperture for transmitting said plural light beams in the center; and a detecting part comprises a luminous energy detecting unit for detecting a luminous energy of said plural light beams transmitted in said aperture from the divided half of said Orthometar lens group.

8. An image formation device for forming a color image composed of plural colors, comprising:

plural light source arrays provided corresponding to said plural colors and provided with plural light emitting elements arrayed at least in a horizontal scanning direction for emitting plural light beams modulated based upon picture signals corresponding to said plural colors from said plural light emitting elements;

plural image carriers provided corresponding to said plural colors and exposed by said plural light beams from said plural light source arrays on which a latent image is formed by moving each of plural image carriers in a vertical scanning direction;

a projection optical system for respectively imaging said plural light beams on said plural image carriers and forming said latent image after said plural light beams from said plural light source arrays are focused on a common focus of a single lens of the projection optical system, wherein the portion of the optical system facing the light emitting elements is telecentric;

a detecting part that detects the luminous energy of said plural light beams from said plural light source arrays; and a control part that controls the driving condition of said plural light emitting elements based upon the luminous energy detected by said detecting part of said plural light beams.

9. An image formation device according to claim 8, wherein:

said detecting part comprises:

a splitting optical system arranged on an optical path of said plural light beams from plural light emitting element groups for splitting said plural light beams from said plural light emitting element groups into the directions of said plural image carriers and into a predetermined direction different from the directions of said plural image carriers;

a deflecting optical system for deflecting said plural light beams split into said predetermined direction by said splitting optical system so that principal rays of said light beams converge or collect in a certain area; and a luminous energy detecting unit arranged at a point at which said principal rays deflected by said deflecting optical system converge or in the vicinity thereof for detecting the luminous energy of said plural light beams.

10. The image formation device according to claim 9, wherein:

said deflecting optical system is an anamorphic mirror.

11. The image formation device according to claim 9, wherein:

said deflecting optical system is an optical mirror having a toroidal surface in said horizontal scanning direction and having a cylindrical surface in said vertical scanning direction.

12. The image formation device according to claim 8, wherein:

said detecting part comprises a splitting optical system arranged on the optical path of said plural light beams from said plural light source arrays for splitting said plural light beams from said plural light source arrays into the directions of said plural image carriers and into a predetermined direction different from the directions of said plural image carriers and luminous energy detecting units fewer than said light source arrays for detecting the luminous energy of said plural light beams split into said predetermined direction by said splitting optical system.

13. The image formation device according to claim 12, wherein:

said splitting optical system uses a half mirror so that angles of incidence at which said plural light beams from said plural light source arrays are incident on said half mirror are approximately equal.

14. The image formation device according to claim 12, wherein:

said projection optical system comprises an imaging optical system for focusing said plural light beams from said plural light source arrays on said common focus and respectively imaging the light beams on said plural image carriers; and said splitting optical system comprises a planar half mirror arranged between said plural light source arrays and said imaging optical system and a hemispherical half mirror arranged between said imaging optical system and said plural image carriers and sharing said focus of said imaging optical system.

15. An image formation device according to claim 8, wherein:

said detecting part comprises an optical element positioned before a luminous energy detecting unit for focusing said plural light beams on said detecting unit.

16. The image formation device according to claim 9, wherein:

said detecting part comprises a luminous energy detecting unit separated from a position in which said light beams are focused by said projection optical system and arranged in a position in which said light beams are projected within a light receiving area of the detecting unit.

\* \* \* \* \*